(12) United States Patent
Dinh et al.

(10) Patent No.: US 7,667,145 B2
(45) Date of Patent: Feb. 23, 2010

(54) RECESSED OUTLET BOX ASSEMBLY

(75) Inventors: Cong Thanh Dinh, Collierville, TN (US); Robert K. Jolly, Cordova, TN (US)

(73) Assignee: Thomas & Belts International, Inc., Wilmington, DE (US)

( * ) Notice: Subject to any disclaimer, the term of this patent is extended or adjusted under 35 U.S.C. 154(b) by 51 days.

(21) Appl. No.: 11/888,047

(22) Filed: Jul. 31, 2007

(65) Prior Publication Data

US 2008/0017413 A1 Jan. 24, 2008

Related U.S. Application Data

(63) Continuation-in-part of application No. 11/484,955, filed on Jul. 12, 2006, which is a continuation of application No. 11/131,597, filed on May 18, 2005, now Pat. No. 7,078,618, and a continuation-in-part of application No. 29/205,607, filed on May 18, 2004, now Pat. No. Des. 545,276.

(60) Provisional application No. 60/572,276, filed on May 18, 2004.

(51) Int. Cl.
*H02G 3/08* (2006.01)
(52) U.S. Cl. .................. 174/480; 174/481; 174/53; 174/57; 174/58; 220/3.2; 220/3.3; 248/906
(58) Field of Classification Search ................ 174/480, 174/481, 50, 53, 57, 58, 521, 59, 61, 63, 174/66, 67, 503, 489; 220/3.2–3.9, 4.02, 220/241, 242; 439/535, 536, 136, 147, 142, 439/135; 248/906, 200, 343; D13/152, 177; 361/642, 600, 641; 33/528
See application file for complete search history.

(56) References Cited

U.S. PATENT DOCUMENTS

| 691,874 | A | 1/1902 | Robinson |
| 916,436 | A | 3/1909 | Greenfield |
| 1,694,054 | A | 12/1928 | Both |
| 1,775,665 | A | 9/1930 | Behm |
| 2,272,846 | A | 2/1942 | Lindstrom |
| 2,378,861 | A | 6/1945 | Peevey |
| 2,433,917 | A | 1/1948 | McCartney |

(Continued)

FOREIGN PATENT DOCUMENTS

CA 644330 7/1962

OTHER PUBLICATIONS

U.S. Appl. No. 11/401,495, filed Apr. 10, 2006, Dinh.

(Continued)

*Primary Examiner*—Angel R Estrada
(74) *Attorney, Agent, or Firm*—Hoffman & Baron, LLP

(57) ABSTRACT

The present invention provides an outlet box assembly including an outlet box having a bottom wall bounded by an outwardly extending perimeter wall forming a housing for receiving a first receptacle. An attachment structure is disposed in the housing for securing the first receptacle to the outlet box. The perimeter wall includes a first portion extending from the bottom wall and a second portion extending at an oblique angle from the first portion. The second wall portion includes an opening for supporting a second receptacle. The assembly includes a cover movable between open and closed positions and between retracted and un-retracted positions.

35 Claims, 29 Drawing Sheets

U.S. PATENT DOCUMENTS

| | | | |
|---|---|---|---|
| 2,510,745 A | 6/1950 | Kilgore | |
| 2,514,745 A | 7/1950 | Dalzell | |
| 2,531,698 A | 11/1950 | Petrick et al. | |
| 2,757,817 A | 8/1956 | Egan | |
| 2,828,394 A | 3/1958 | Mayzik | |
| 2,916,733 A | 12/1959 | Hirsch | |
| 2,989,206 A | 6/1961 | McAfee | |
| 3,168,613 A | 2/1965 | Palmer | |
| 3,289,852 A | 12/1966 | Kahn | |
| 3,365,156 A | 1/1968 | Beck | |
| D214,449 S | 6/1969 | Greene | |
| 3,530,230 A | 9/1970 | Cormier et al. | |
| 3,622,029 A | 11/1971 | Ware | |
| 3,701,451 A | 10/1972 | Schindler et al. | |
| 3,834,658 A | 9/1974 | Theodorides | |
| 3,864,511 A | 2/1975 | Morby et al. | |
| 3,917,899 A | 11/1975 | Oliver | |
| 4,059,327 A | 11/1977 | Vann | |
| 4,062,470 A | 12/1977 | Boteler | |
| 4,098,423 A | 7/1978 | Marrero | |
| 4,109,095 A | 8/1978 | Kling et al. | |
| 4,134,636 A | 1/1979 | Kleinatland et al. | |
| 4,265,365 A | 5/1981 | Boteler | |
| 4,417,373 A | 11/1983 | Keglewitsch | |
| 4,424,407 A | 1/1984 | Barbic | |
| 4,438,859 A | 3/1984 | Solek | |
| 4,443,654 A | 4/1984 | Flachbarth et al. | |
| 4,451,108 A | 5/1984 | Skidmore | |
| 4,505,403 A | 3/1985 | Bowden, Jr. et al. | |
| 4,559,410 A | 12/1985 | Hostetter | |
| 4,599,485 A | 7/1986 | Smolik | |
| 4,603,229 A | 7/1986 | Menchetti | |
| 4,603,932 A | 8/1986 | Heverly | |
| 4,605,817 A | 8/1986 | Lopez | |
| 4,613,728 A | 9/1986 | Lathrop | |
| 4,634,015 A | 1/1987 | Taylor | |
| 4,636,914 A | 1/1987 | Belli | |
| 4,642,418 A | 2/1987 | Menchetti | |
| 4,673,097 A | 6/1987 | Schuldt | |
| 4,684,092 A | 8/1987 | Reiker | |
| 4,685,581 A | 8/1987 | Kaneda et al. | |
| 4,721,476 A | 1/1988 | Zeliff et al. | |
| 4,724,281 A | 2/1988 | Nix et al. | |
| 4,747,506 A | 5/1988 | Stuchilk, III | |
| 4,758,687 A | 7/1988 | Lathrop | |
| 4,778,399 A | 10/1988 | Schenk | |
| 4,803,307 A | 2/1989 | Shotey | |
| 4,927,039 A | 5/1990 | McNab | |
| D308,464 S | 6/1990 | Freeman et al. | |
| 4,936,794 A | 6/1990 | Shaw et al. | |
| 4,971,280 A | 11/1990 | Rinderer | |
| 4,972,045 A | 11/1990 | Primeau | |
| 4,988,832 A | 1/1991 | Shotey | |
| 5,008,491 A * | 4/1991 | Bowman | 174/489 |
| 5,012,043 A | 4/1991 | Seymour | |
| 5,042,673 A | 8/1991 | McShane | |
| 5,085,393 A | 2/1992 | Ryan | |
| 5,114,365 A | 5/1992 | Thompson et al. | |
| 5,117,122 A | 5/1992 | Hogarth et al. | |
| 5,117,996 A | 6/1992 | McShane | |
| 5,142,102 A | 8/1992 | Michie | |
| 5,171,939 A | 12/1992 | Shotey | |
| 5,218,169 A | 6/1993 | Riceman | |
| 5,231,562 A * | 7/1993 | Pierce et al. | 174/494 |
| 5,243,134 A | 9/1993 | Nattel | |
| 5,245,507 A | 9/1993 | Ericksen | |
| 5,257,946 A | 11/1993 | MacMillan et al. | |
| 5,280,135 A | 1/1994 | Berlin et al. | |
| D343,825 S | 2/1994 | Enderby | |
| 5,287,665 A | 2/1994 | Rath, Jr. | |
| 5,289,934 A | 3/1994 | Smith et al. | |
| D348,870 S | 7/1994 | Warrington | |
| 5,326,060 A | 7/1994 | Chubb et al. | |
| 5,349,134 A * | 9/1994 | Russell | 174/53 |
| 5,369,548 A | 11/1994 | Combs | |
| 5,389,740 A | 2/1995 | Austin | |
| 5,419,716 A | 5/1995 | Sciammarella et al. | |
| 5,420,376 A | 5/1995 | Rajecki et al. | |
| 5,434,359 A | 7/1995 | Schnell | |
| 5,466,886 A | 11/1995 | Lengyel et al. | |
| 5,486,650 A | 1/1996 | Yetter | |
| 5,522,577 A | 6/1996 | Roesch | |
| 5,533,637 A | 7/1996 | Williams, Jr. | |
| 5,549,266 A | 8/1996 | Mitchell et al. | |
| 5,574,255 A | 11/1996 | Simmons | |
| 5,574,256 A | 11/1996 | Cottone | |
| 5,596,174 A | 1/1997 | Sapienza | |
| 5,598,998 A | 2/1997 | Lynn | |
| 5,600,093 A | 2/1997 | Herth et al. | |
| 5,603,424 A | 2/1997 | Bordwell et al. | |
| 5,613,876 A | 3/1997 | Sakatani et al. | |
| 5,651,696 A | 7/1997 | Jennison | |
| 5,683,005 A | 11/1997 | Mordick | |
| 5,773,760 A | 6/1998 | Stark et al. | |
| 5,804,764 A | 9/1998 | Gretz | |
| 5,918,431 A | 7/1999 | Schiedegger et al. | |
| 5,931,325 A | 8/1999 | Filipov | |
| 5,934,917 A | 8/1999 | Haut | |
| 5,967,354 A | 10/1999 | Whitehead et al. | |
| 5,975,323 A | 11/1999 | Turan | |
| 6,026,605 A | 2/2000 | Tippett | |
| 6,028,267 A * | 2/2000 | Byrne | 174/57 |
| 6,028,268 A | 2/2000 | Stark et al. | |
| D422,266 S | 4/2000 | Roesch | |
| 6,093,890 A | 7/2000 | Gretz | |
| 6,102,360 A | 8/2000 | Clegg et al. | |
| 6,112,927 A | 9/2000 | Gertz | |
| 6,127,630 A | 10/2000 | McKenzie et al. | |
| 6,147,304 A | 11/2000 | Doherty | |
| 6,172,298 B1 | 1/2001 | Norvelle | |
| 6,194,657 B1 | 2/2001 | Gretz | |
| 6,198,045 B1 | 3/2001 | Roesch | |
| 6,200,159 B1 | 3/2001 | Chou | |
| 6,207,895 B1 | 3/2001 | Engel | |
| 6,222,124 B1 | 4/2001 | Pritchard et al. | |
| 6,239,368 B1 | 5/2001 | Gertz | |
| 6,268,563 B1 | 7/2001 | Gretz | |
| 6,323,424 B1 | 11/2001 | He | |
| 6,346,674 B1 | 2/2002 | Gretz | |
| 6,355,882 B1 | 3/2002 | Gretz | |
| 6,414,241 B1 | 7/2002 | O'Donnell | |
| 6,414,906 B1 | 7/2002 | Gaspari | |
| 6,429,371 B2 | 8/2002 | Schiedegger et al. | |
| 6,437,242 B1 | 8/2002 | Radosavljevic et al. | |
| D462,939 S | 9/2002 | Dinh | |
| D463,376 S | 9/2002 | Roesch et al. | |
| 6,444,906 B1 | 9/2002 | Lewis | |
| D463,969 S | 10/2002 | Luu | |
| D467,229 S | 12/2002 | Heggem | |
| 6,557,305 B1 | 5/2003 | Hayes | |
| 6,563,051 B1 | 5/2003 | Shotey et al. | |
| 6,566,602 B1 | 5/2003 | Miller et al. | |
| 6,576,835 B1 | 6/2003 | Ford et al. | |
| 6,586,679 B2 | 7/2003 | Bashford | |
| D478,553 S | 8/2003 | Heggem | |
| 6,608,253 B1 | 8/2003 | Rintz | |
| 6,637,166 B2 | 10/2003 | Kinsey | |
| 6,727,428 B2 | 4/2004 | Archer et al. | |
| 6,737,576 B1 | 5/2004 | Dinh | |
| 6,753,471 B2 | 6/2004 | Johnson et al. | |
| D495,301 S | 8/2004 | Newell | |
| 6,808,079 B2 | 10/2004 | Lalancette et al. | |
| 6,818,823 B2 | 11/2004 | Barnes | |
| 6,843,669 B2 | 1/2005 | Drane et al. | |

| | | |
|---|---|---|
| 6,858,802 B2 | 2/2005 | Hagarty et al. |
| 6,872,887 B2 | 3/2005 | Shotey et al. |
| 6,908,003 B2 | 6/2005 | Feyes et al. |
| 6,953,894 B2 | 10/2005 | Ungerman et al. |
| 6,956,171 B1 | 10/2005 | Gretz |
| 6,965,078 B1 | 11/2005 | Gretz |
| 7,005,578 B2 | 2/2006 | Gretz |
| 7,009,111 B1 | 3/2006 | Rintz |
| 7,038,131 B1 | 5/2006 | Gretz |
| 7,044,318 B2 | 5/2006 | Gates, II |
| 7,057,105 B2 | 6/2006 | Gottardo |
| 7,064,268 B2 | 6/2006 | Dinh |
| 7,078,618 B2 | 7/2006 | Dinh |
| D527,984 S | 9/2006 | Dinh |
| 7,105,745 B2 * | 9/2006 | Drane et al. .................. 174/67 |
| 7,109,419 B1 | 9/2006 | Gretz |
| 7,205,488 B2 * | 4/2007 | Riner .......................... 174/481 |
| D545,276 S | 6/2007 | Dinh |
| 7,374,058 B2 * | 5/2008 | Dinh et al. ................... 220/3.8 |
| 7,431,594 B2 * | 10/2008 | Castaldo et al. ............... 174/67 |
| 2003/0024927 A1 | 2/2003 | MacDonald |
| 2003/0178421 A1 | 9/2003 | Almond |
| 2004/0123996 A1 | 7/2004 | Lalancette et al. |
| 2004/0238197 A1 | 12/2004 | Gates, II |
| 2005/0072778 A1 | 4/2005 | Hull et al. |
| 2006/0249306 A1 | 11/2006 | Dinh |

OTHER PUBLICATIONS

TayMac Corporation, 2003 Catalog, pp. 1-14.
U.S. Appl. No. 11/401,495, filed Apr. 10, 2006.

* cited by examiner

RECESSED OUTLET BOX ASSEMBLY

CROSS-REFERENCE TO RELATED APPLICATIONS

This patent application is continuation-in-part of U.S. patent application Ser. No. 11/484,955 filed on Jul. 12, 2006, which is a continuation of U.S. patent application Ser. No. 11/131,597, filed on May 18, 2005, now U.S. Pat. No. 7,078, 618, which claims priority to and the benefit of U.S. Provisional Patent Application No. 60/572,276 filed on May 18, 2004, the entire disclosures of all of the referenced applications are hereby incorporated by reference. U.S. patent application Ser. No. 11/131,597 is a continuation-in-part of U.S. Design patent application Ser. No. 29/205,607 filed on May 18, 2004, now U.S. Pat. No. D545,276, the entire disclosure of which is hereby incorporated by reference.

BACKGROUND OF THE INVENTION

The present invention relates generally to outlet boxes for mounting electrical outlets and connectors on wall structures, and more particularly, to such an outlet box in which the electrical outlet and connector is recessed from the wall structure.

Electrical outlet boxes which support an electrical receptacle and a connector are known. Such outlet boxes may support the electrical receptacle in the plane of the outer surface of the wall structure. As a result, when a plug is inserted into the electrical receptacle which is so supported, the plug extends outward of the wall surface. The electrical plug is thereby exposed to being struck by a transverse force such as from a person, piece of furniture or other object which may move along the side of the wall structure in close proximity thereto. If such a transverse force is sufficient, it may dislodge the plug from the electrical receptacle, either partially or completely, or cause damage to the plug or receptacle, as well as a combination thereof. Additionally, extension of the electrical plug beyond the outer surface of the wall structure normally prevents the positioning of a piece of furniture, wall hanging or similar object in close proximity to the outer surface of the wall in the vicinity of the electrical receptacle. Such an object may, for example, be a television which would desirably be positioned close to the outer surface of the wall structure in front of and adjacent to the electrical receptacle. This would enable the power cable from the television to extend to the electrical receptacle for connection thereto and for the power cable and electrical receptacle to be obstructed from view by the television.

To reduce the extension of the electrical plug beyond the outer surface of the wall structure, electrical boxes may be configured to support the electrical receptacle in a recessed position relative to the outer surface of the wall structure. This recessed position of the electrical receptacle reduces or, if sufficient, eliminates entirely the exposure of the electrical plug to the aforementioned undesirable forcible contact.

Additionally, electronic devices frequently require connection to an electrical power source and a separate connection to a communication network, such as a telephone or television network, or a local area network (LAN) or the internet for computers. Examples of such electrical devices include telephones, televisions, answering machines and personal computers. Such requirements typically result in separate electrical cables extending from the electronic devices where the power cable is connected to an electrical receptacle and the communication cable is connected to a separate connector, such as a telephone jack, or a connector for digital data transmission or for a coaxial cable.

To provide the required connection for such cables, the electrical outlet box may have an additional connector for such a cable. Such a cable typically has a cable plug which is coupled to the additional connector. The additional connector may be recessed from the outer surface of the wall structure to reduce the extension of the cable plug which is coupled thereto. This reduction of the extension of the cable plug may limit or eliminate entirely the exposure thereof to undesirable forcible contact, and the unfavorable consequences, similar to those which may befall an electrical plug which extends beyond the outer surface of the wall structure, as described herein above.

The electrical receptacle may be supported within the outlet box by securing the front surface of the electrical receptacle to a vertical flange or similar structure within the outlet box. This may be the only support provided to the electrical receptacle within the outlet box. This limited support may result from clearances being provided between the outer surfaces of the electrical receptacle which do not contact the vertical flange or other support structure within the outlet box. This limited support may necessitate a high strength connection between the limited surface of the electrical receptacle which is directly attached to the outlet box. In the absence of such a high strength connection, the electrical receptacle may undesirably translate or pivot relative to the outlet box, such as when the electrical plug is inserted into the electrical receptacle or if the electrical plug, after insertion thereof into the electrical receptacle, is contacted by an external force.

SUMMARY OF THE INVENTION

The present invention provides an outlet box assembly for accommodating receptacles in a recessed manner.

The present invention further provides an outlet box assembly including an outlet box for securing a first receptacle and a second receptacle, wherein the first receptacle is angularly offset from the second receptacle.

The present invention further provides an outlet box assembly including an outlet box and a cover movable relative to the outlet box between the open, closed, retraced and un-retracted positions.

The present invention provides an outlet box assembly including an outlet box having a bottom wall bounded by an outwardly extending perimeter wall forming a housing for receiving a first receptacle. An attachment structure is disposed in the housing for securing the first receptacle to the outlet box. The perimeter wall includes a first portion extending from the bottom wall and a second portion extending at an oblique angle from the first portion. The second wall portion includes an opening for supporting a second receptacle.

The present invention also provides an outlet box assembly including an outlet box having a bottom wall bounded by an outwardly extending perimeter wall forming a housing for receiving a first receptacle. A first attachment structure is disposed in the housing for securing the first receptacle to the outlet box in a first plane. At least one of the plurality of perimeter walls includes a second attachment structure for securing a second receptacle in the outlet box in a second plane. The first plane is angularly offset from the second plane.

The present invention still further provides an outlet box assembly including an outlet box having a bottom wall bounded by an outwardly extending perimeter wall forming a forming a outlet box interior. The outlet box having an opening for receiving a first electrical receptacle. A first attachment structure is disposed in the housing for securing the first electrical receptacle to the outlet box. The outlet box assembly includes a cover rotatable between an open and closed position to selectively cover and uncover the opening. The cover is translatable to a retracted position wherein the opening is uncovered and the cover is disposed adjacent the perimeter wall.

These and other features of the invention will be more fully understood from the following description of specific embodiments of the invention taken together with the accompanying drawings.

BRIEF DESCRIPTION OF THE DRAWINGS

Corresponding reference characters indicate corresponding parts throughout the several views of the drawings.

DETAILED DESCRIPTION OF THE INVENTION

Figure 1:
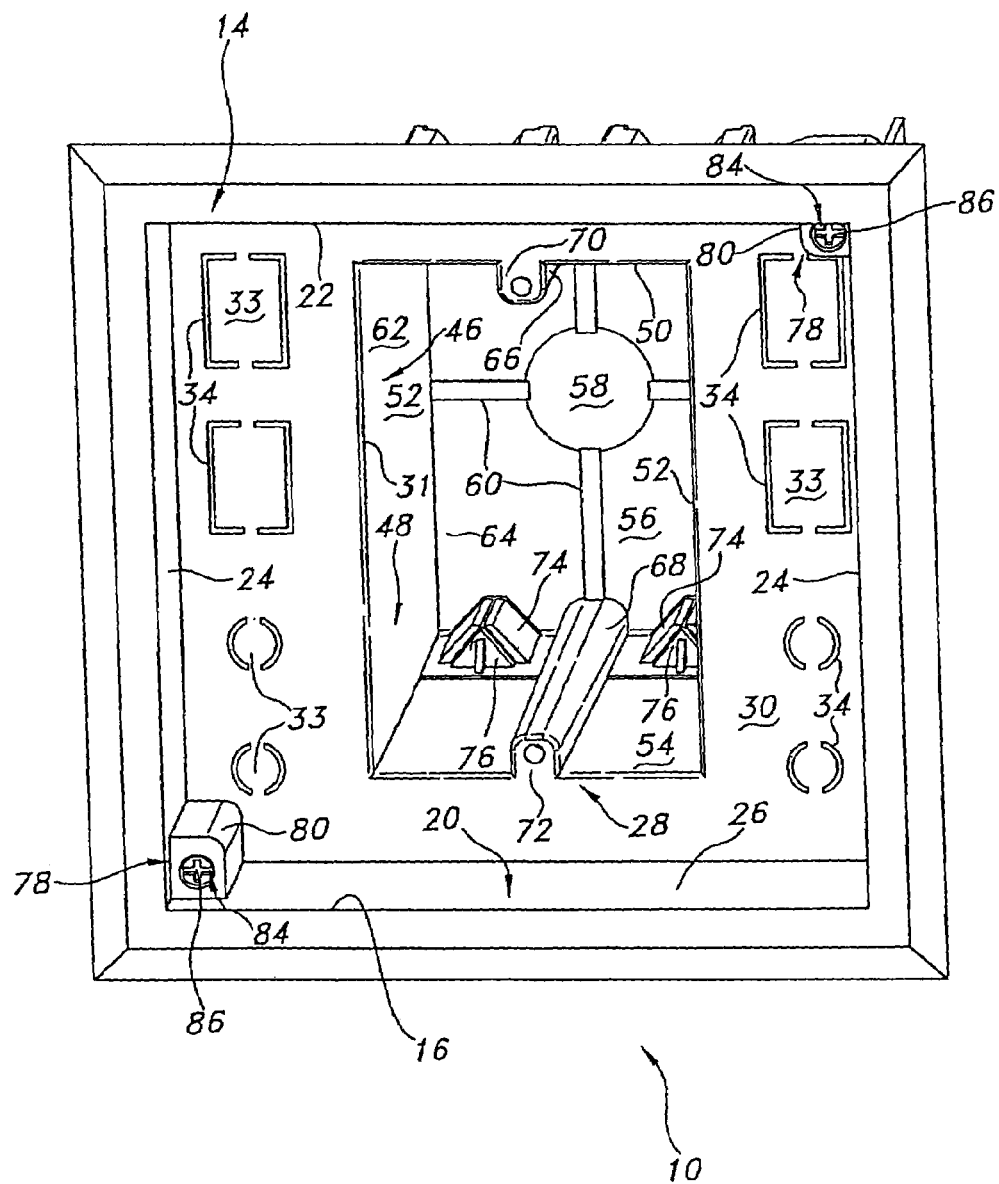
FIG. 1 is a front perspective view of the wall recessed outlet box assembly of the present invention before assembly of the electrical receptacle and interior faceplate thereto and removal of the knockouts from the outer faceplate.

Referring to the drawings and more particularly to FIGS. 1 to 7, a wall recessed outlet box assembly 10 is shown for mounting to a wall structure 12, such as the vertical wall board of an interior wall of a building structure.

The outlet box assembly 10 includes an outer faceplate 14 which has an interior opening 16 and a rear surface 18. The outer faceplate 14 is planar and has an outer edge which may be beveled.

A flange structure 20 is fixed to the rear surface 18 and has a top flange 22, a pair of side flanges 24, and a bottom flange 26 which are fixed to one another such that each of the side flanges is between the top and bottom flanges in perpendicular relation thereto. This results in the flange structure 20 having a vertical cross-section which is rectangular.

The outlet box assembly 10 includes an inner faceplate 28 having a front surface 30 which is fixed to the rear edges of the flange structure 20 such that the inner faceplate is recessed from the outer faceplate 14. The inner faceplate 28 is planar and parallel to the outer faceplate. Access to the inner faceplate 28 is provided through the interior opening 16.

Figure 2:
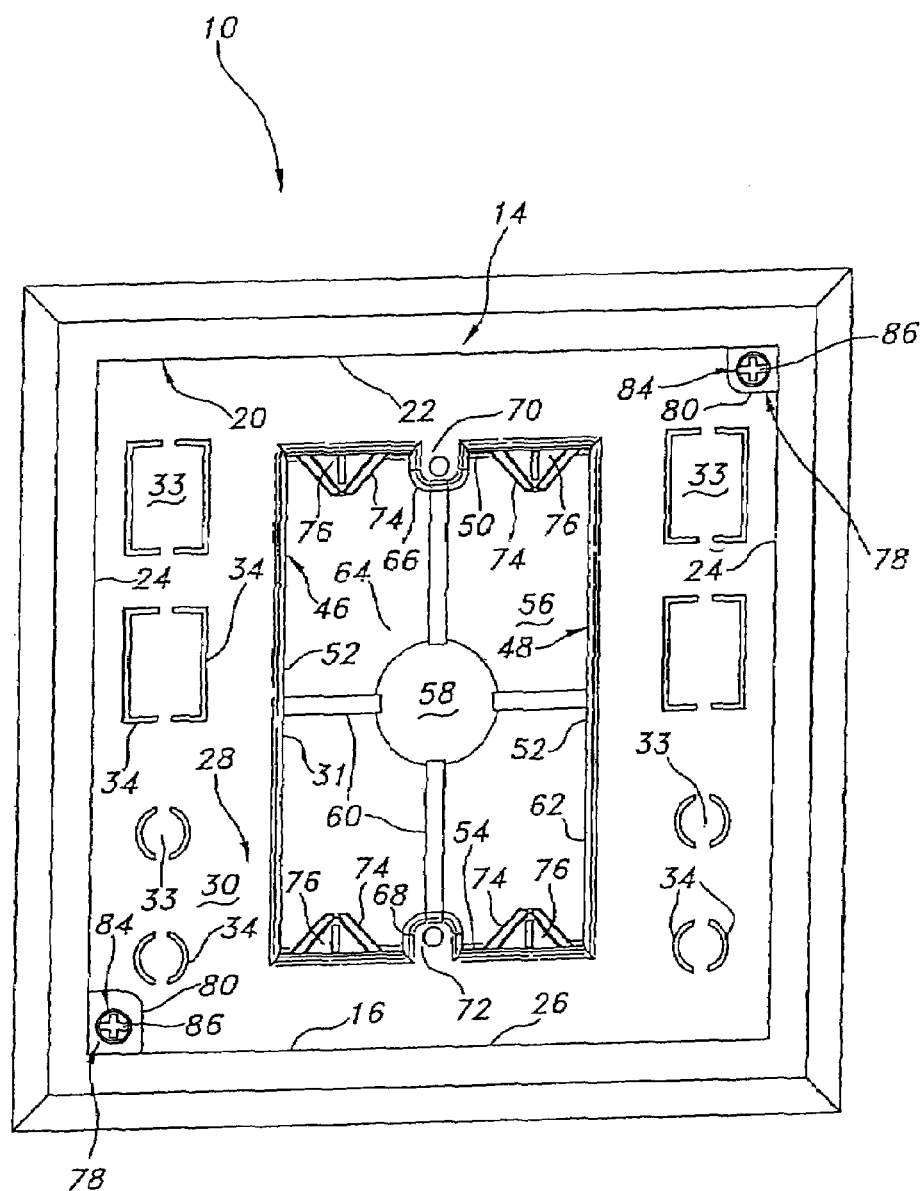
FIG. 2 is a front elevation view of the outlet box assembly of FIG. 1.

The inner faceplate 28 has an outlet port 31 and knockouts 33. The outer peripheries of the knockouts 33 are indented in the rearward direction to form grooves 34 as shown in FIG. 2. The grooves 34 may be indented by a dimension, such as 50 mils. The rear ends of the knockouts 33 do not extend to the rear surface 35 of the inner faceplate 28 resulting in the knockouts being indented in the forward direction. These indentations of the knockouts 33 may be by a dimension, such as 50 mils. The knockouts 33 are removed to provide communication ports 36 in the inner faceplate 28. The communication ports 36 provide openings in which receptacles, such as telephone jacks, co-axial cable connectors or plugs for electrical cables, may be supported. Such cables may be for telephone, cable television, personal computers, data transmissions or digital communications. The communication ports 36 may be referred to as data ports.

Figure 8:
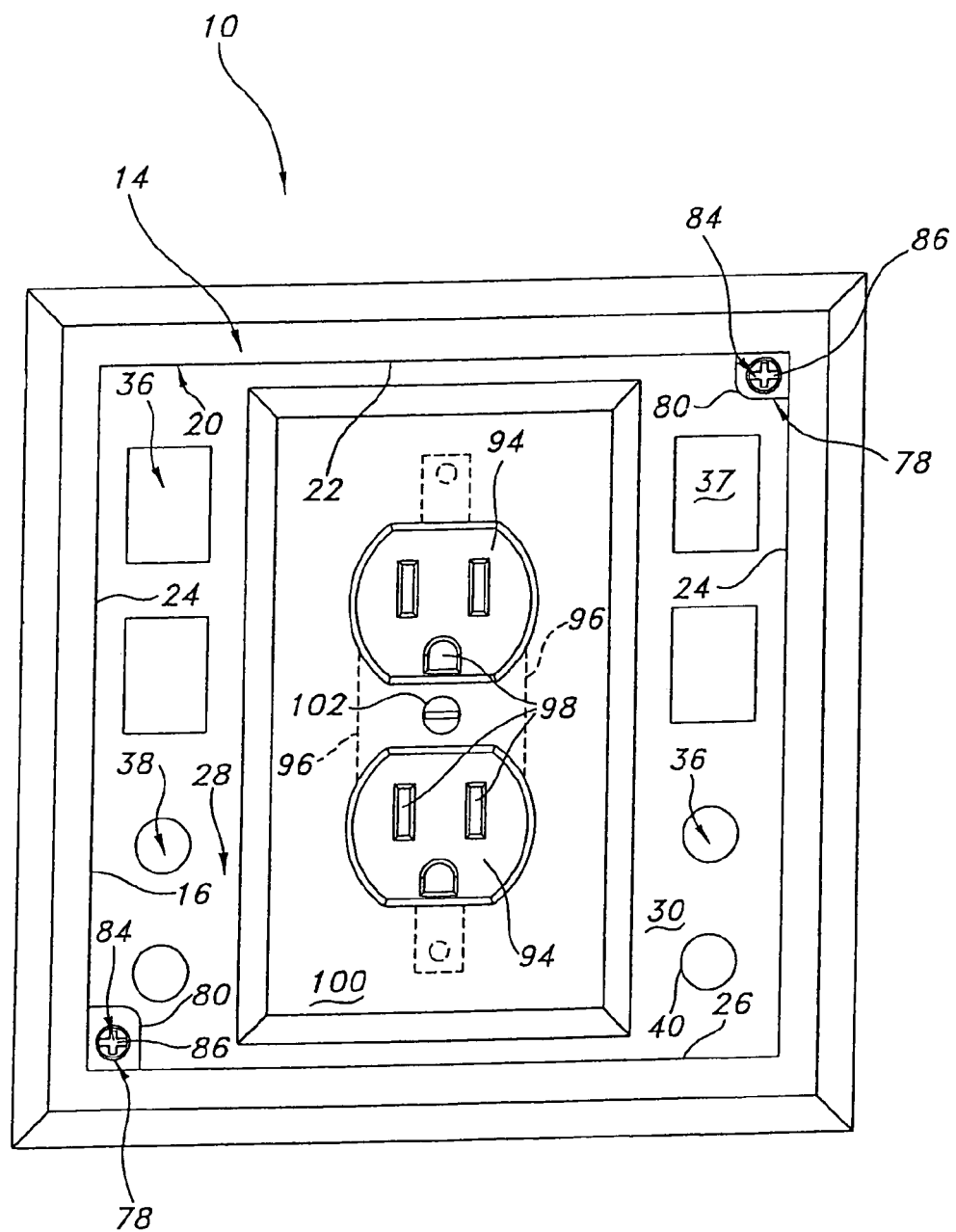
FIG. 8 is a front elevation view of the outlet box assembly of FIG. 1 after assembly of the electrical receptacle and interior faceplate thereto and removal of the knockouts from the outer faceplate.
Figure 9:
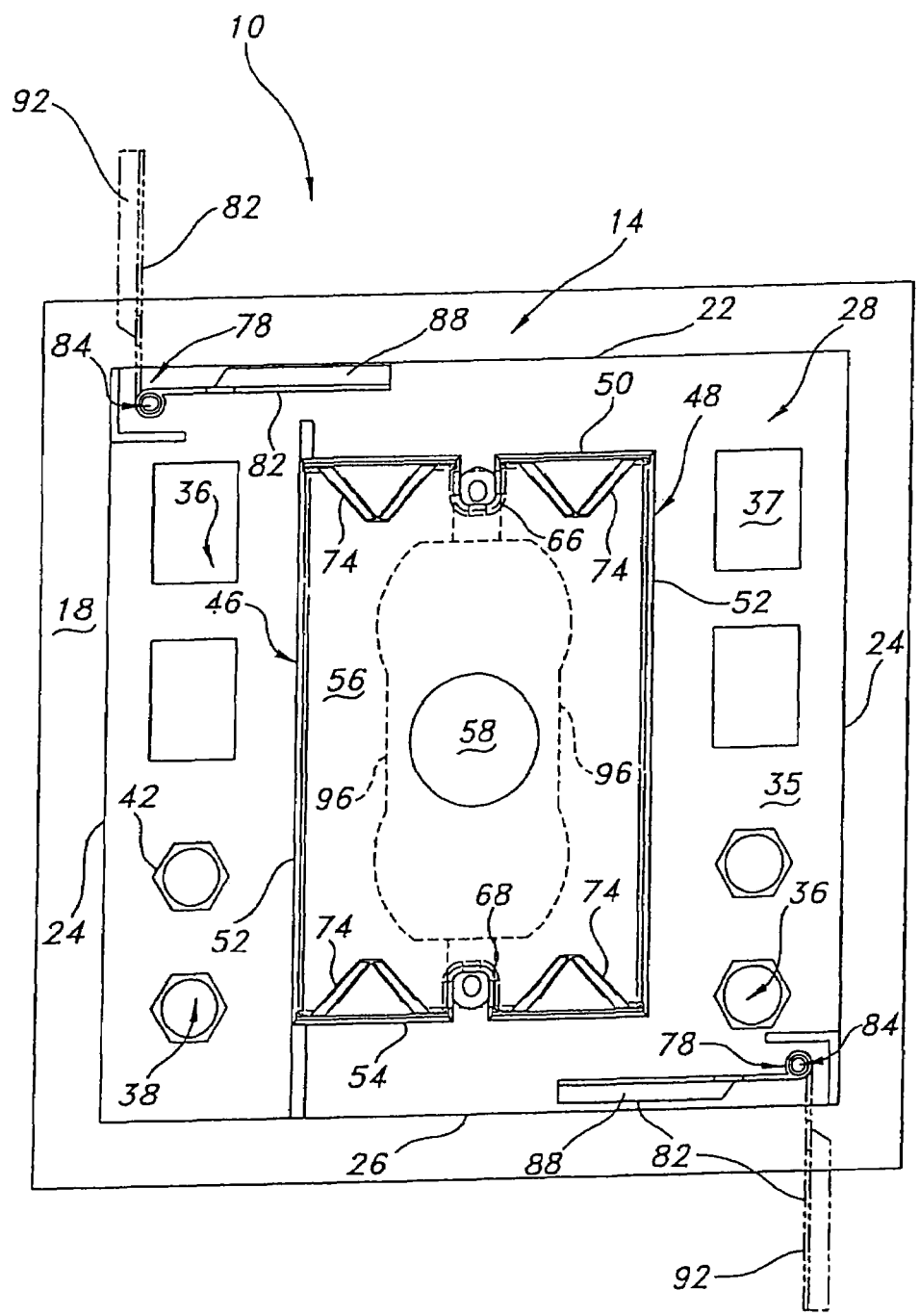
FIG. 9 is a rear elevation view of the outlet box assembly of FIG. 8 showing the arms in the retracted and clamped positions.
Figure 10:
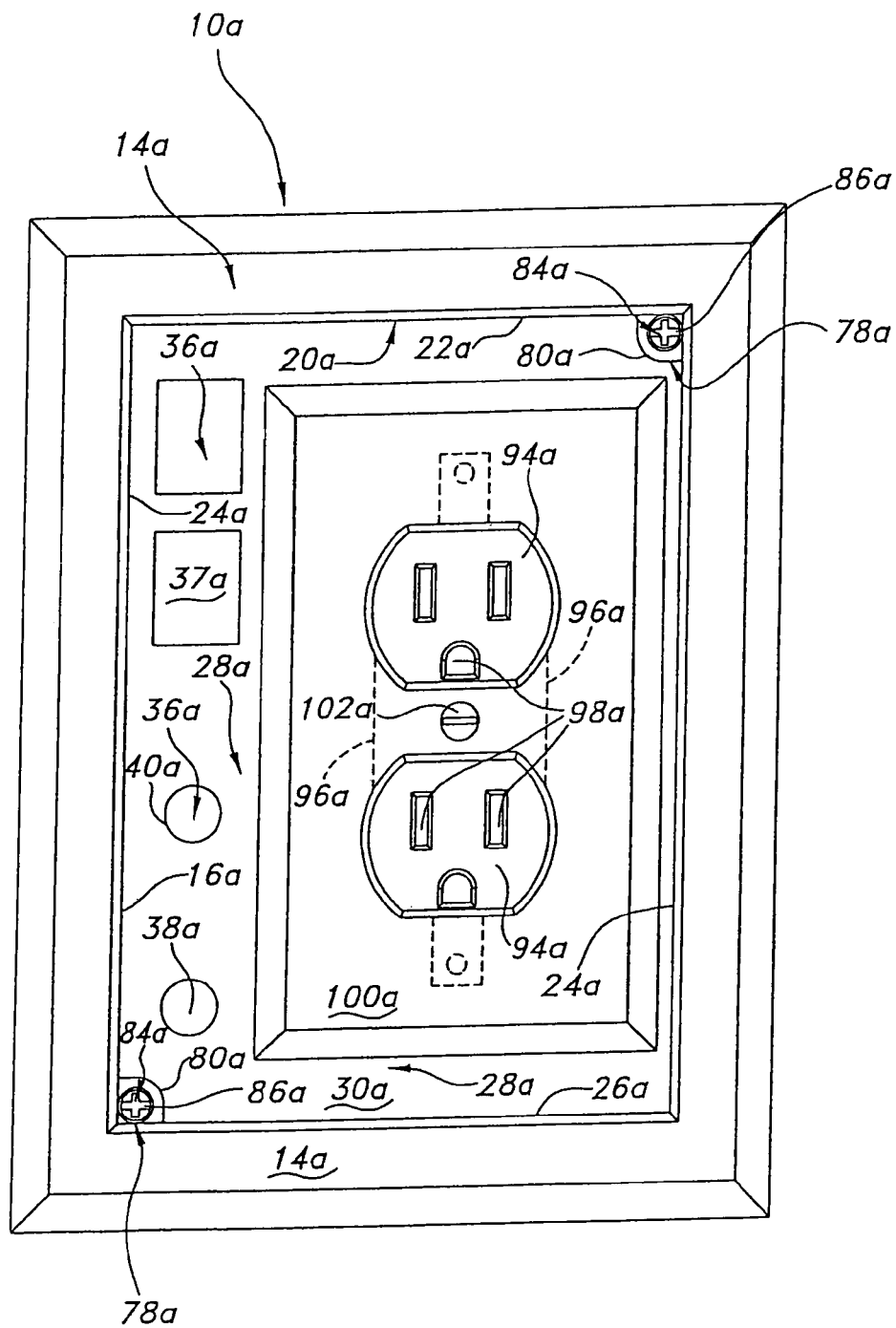
FIG. 10 is a front elevation view of an alternative second embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 11:
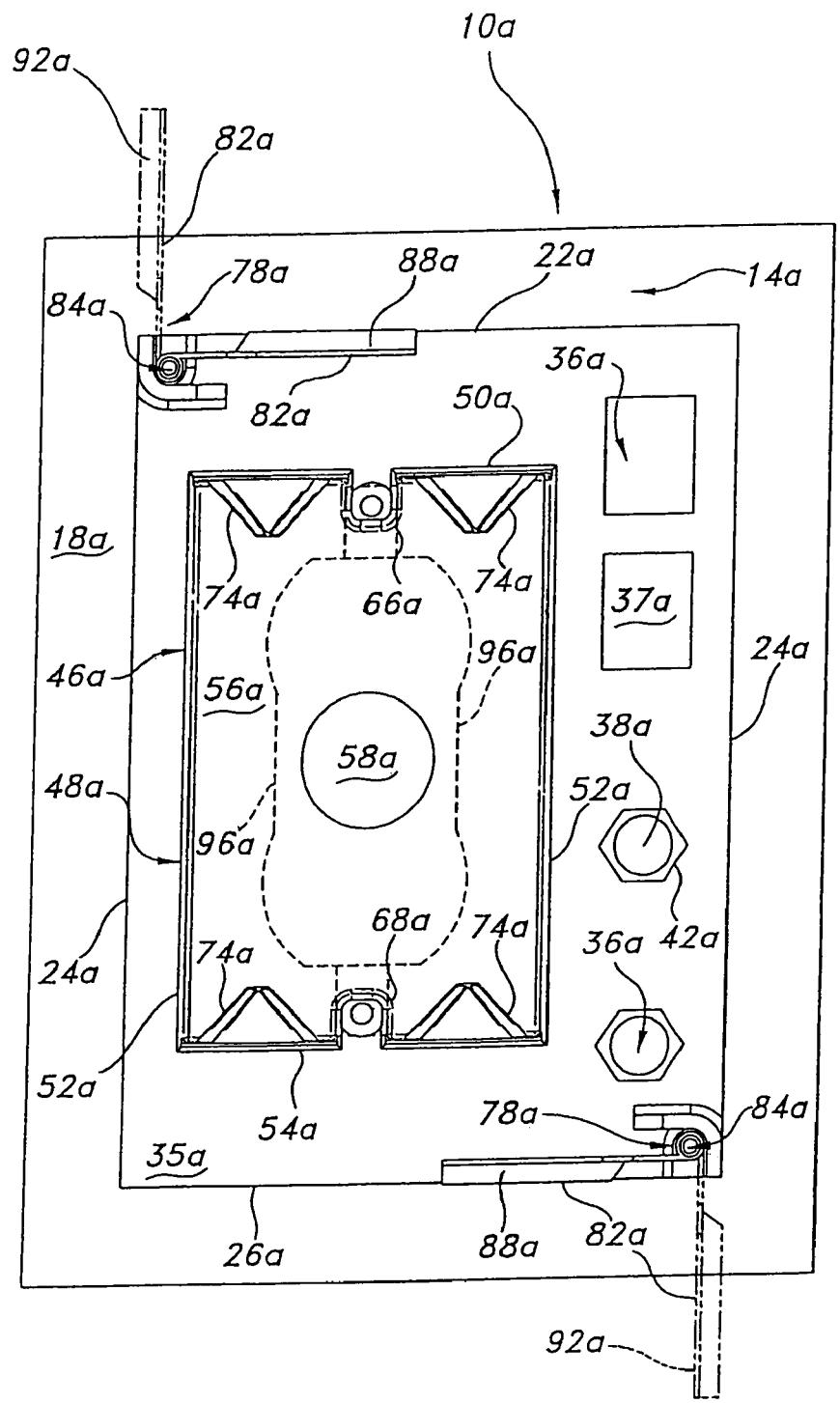
FIG. 11 is a rear elevation view of the outlet box assembly of FIG. 10 showing the arms in the retracted and clamped positions.
Figure 12:
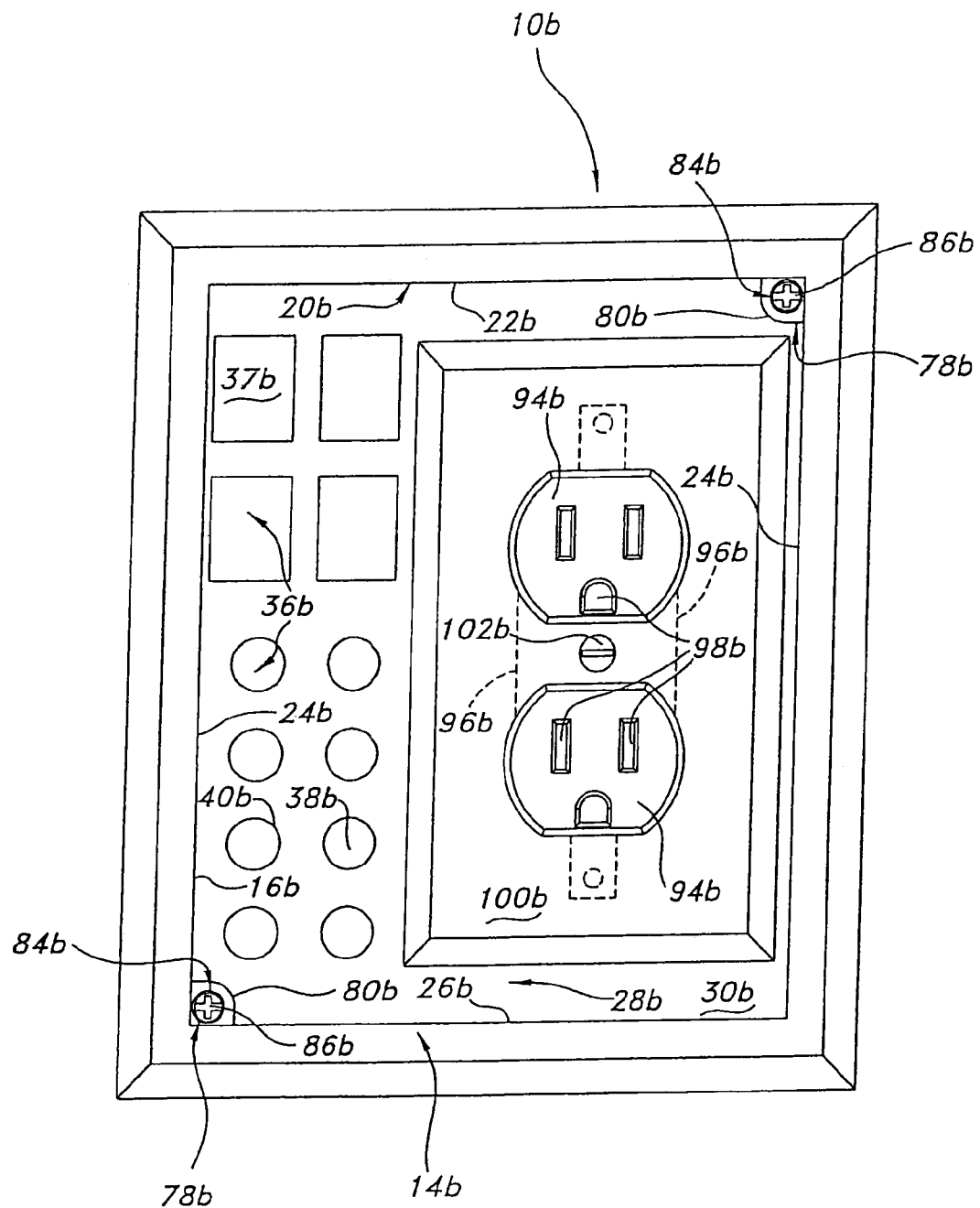
FIG. 12 is a front elevation view of an alternative third embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 13:
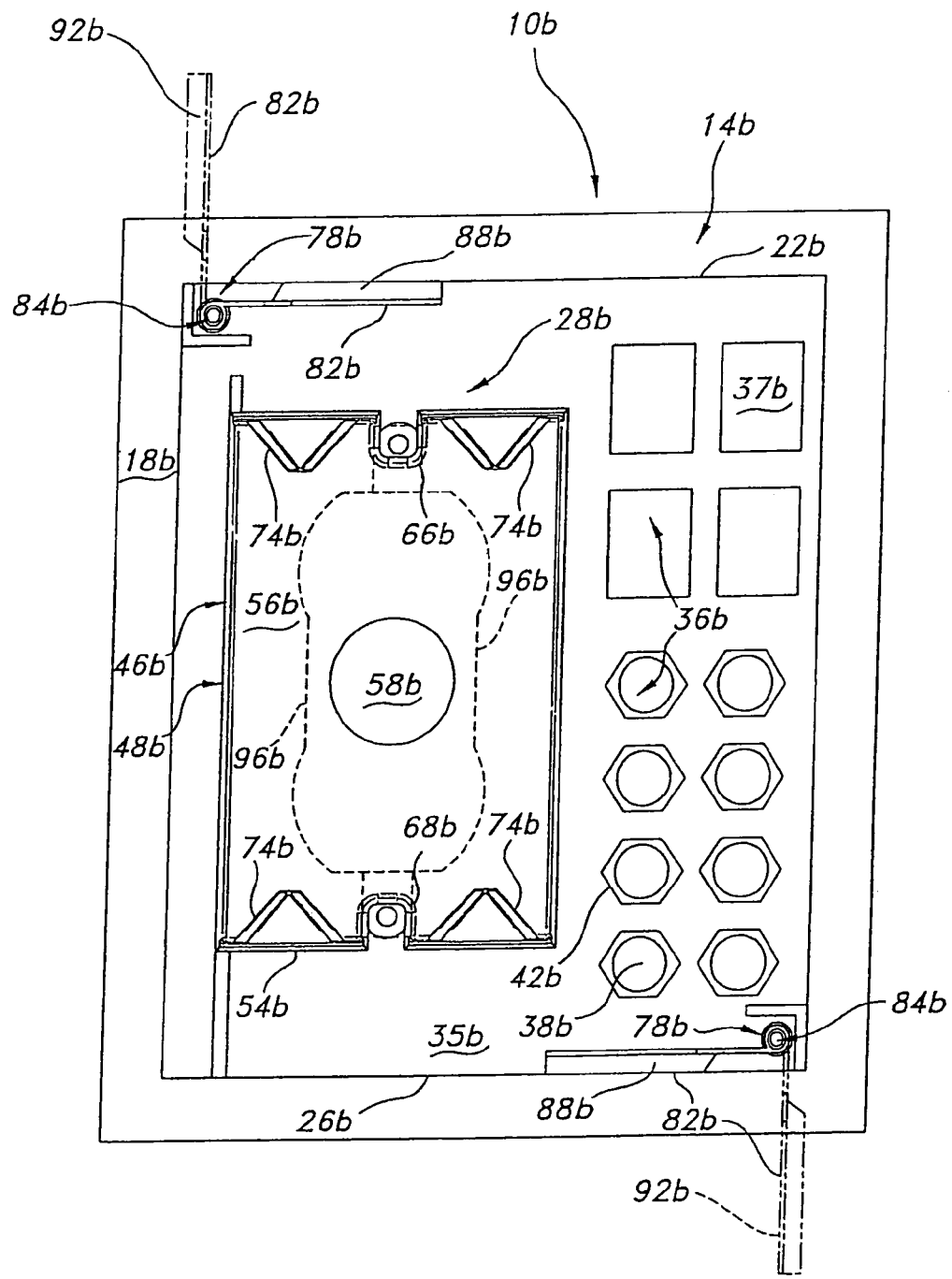
FIG. 13 is a rear elevation view of the outlet box assembly of FIG. 12 showing the arms in the retracted and clamped positions.
Figure 14:
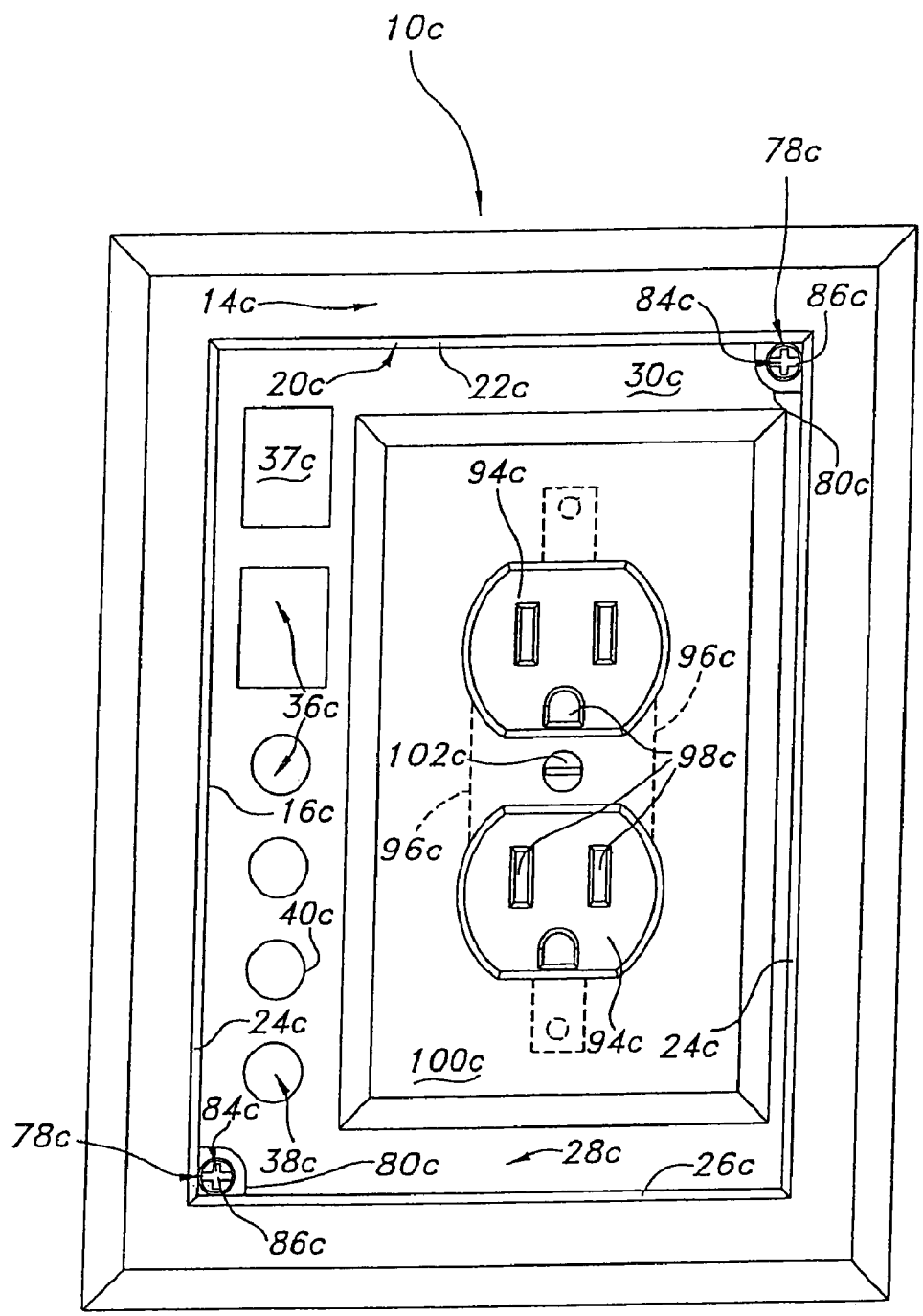
FIG. 14 is a front elevation view of an alternative fourth embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 15:
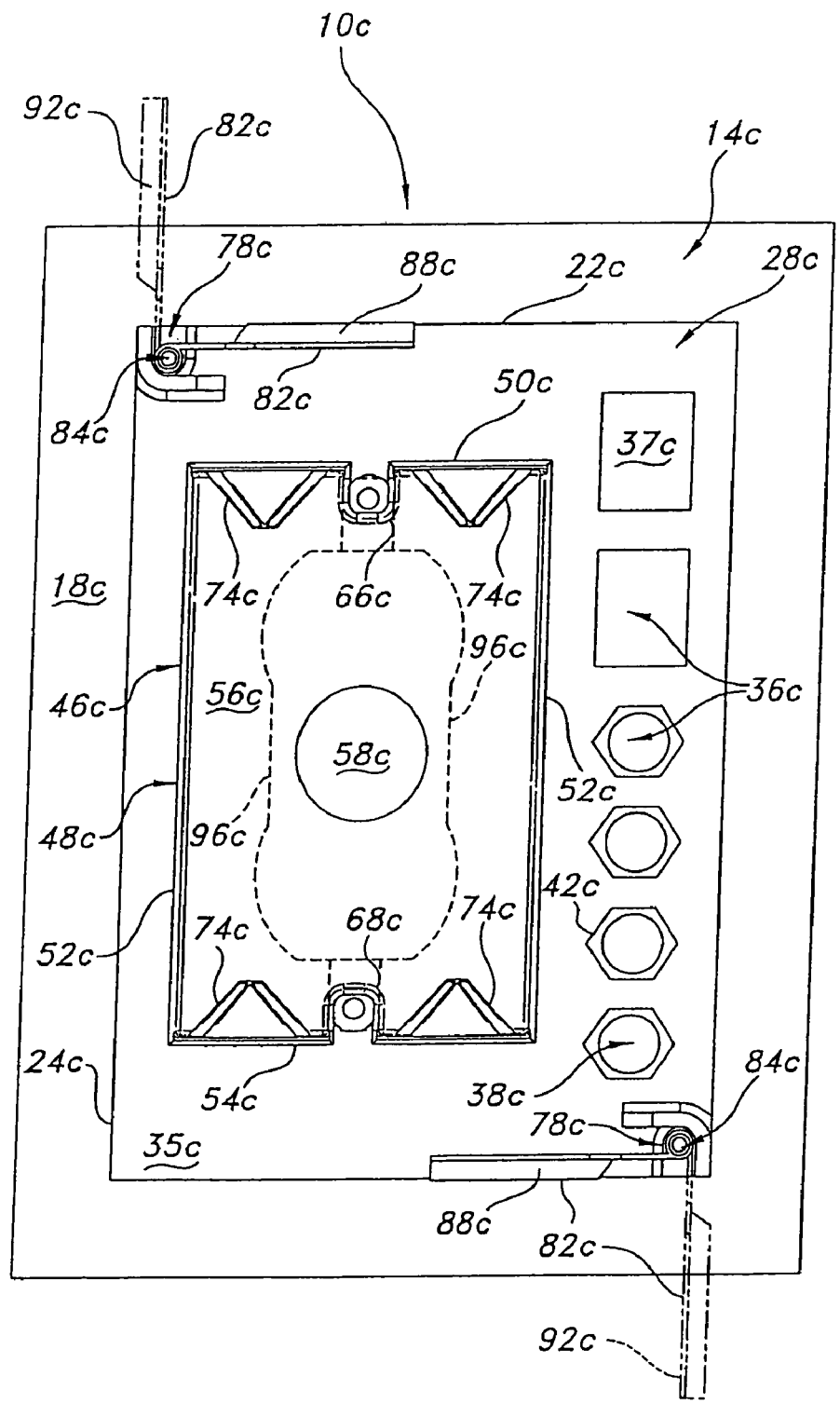
FIG. 15 is a rear elevation view of the outlet box assembly of FIG. 14 showing the arms in the retracted and clamped positions.
Figure 16:
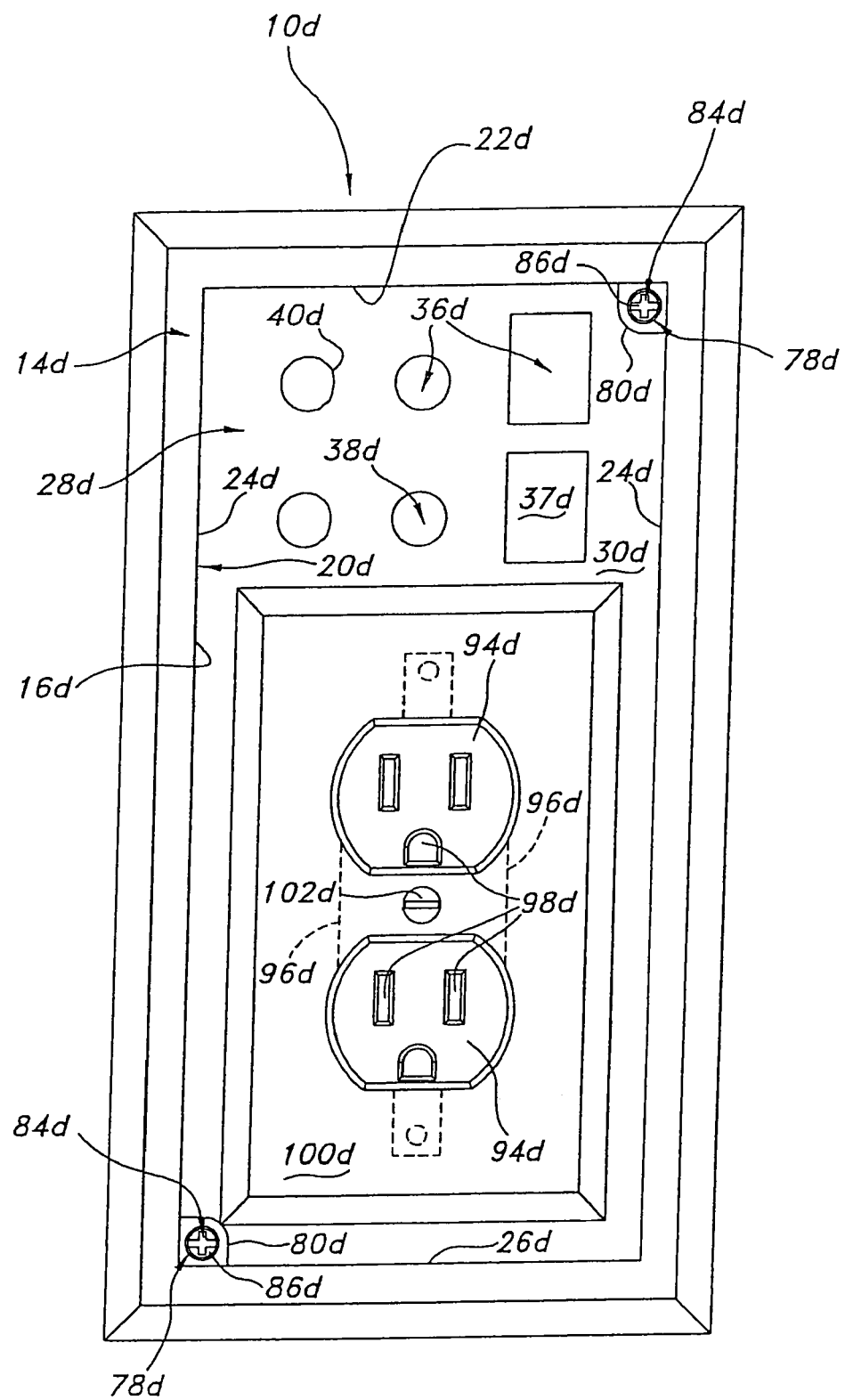
FIG. 16 is a front elevation view of an alternative fifth embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 17:
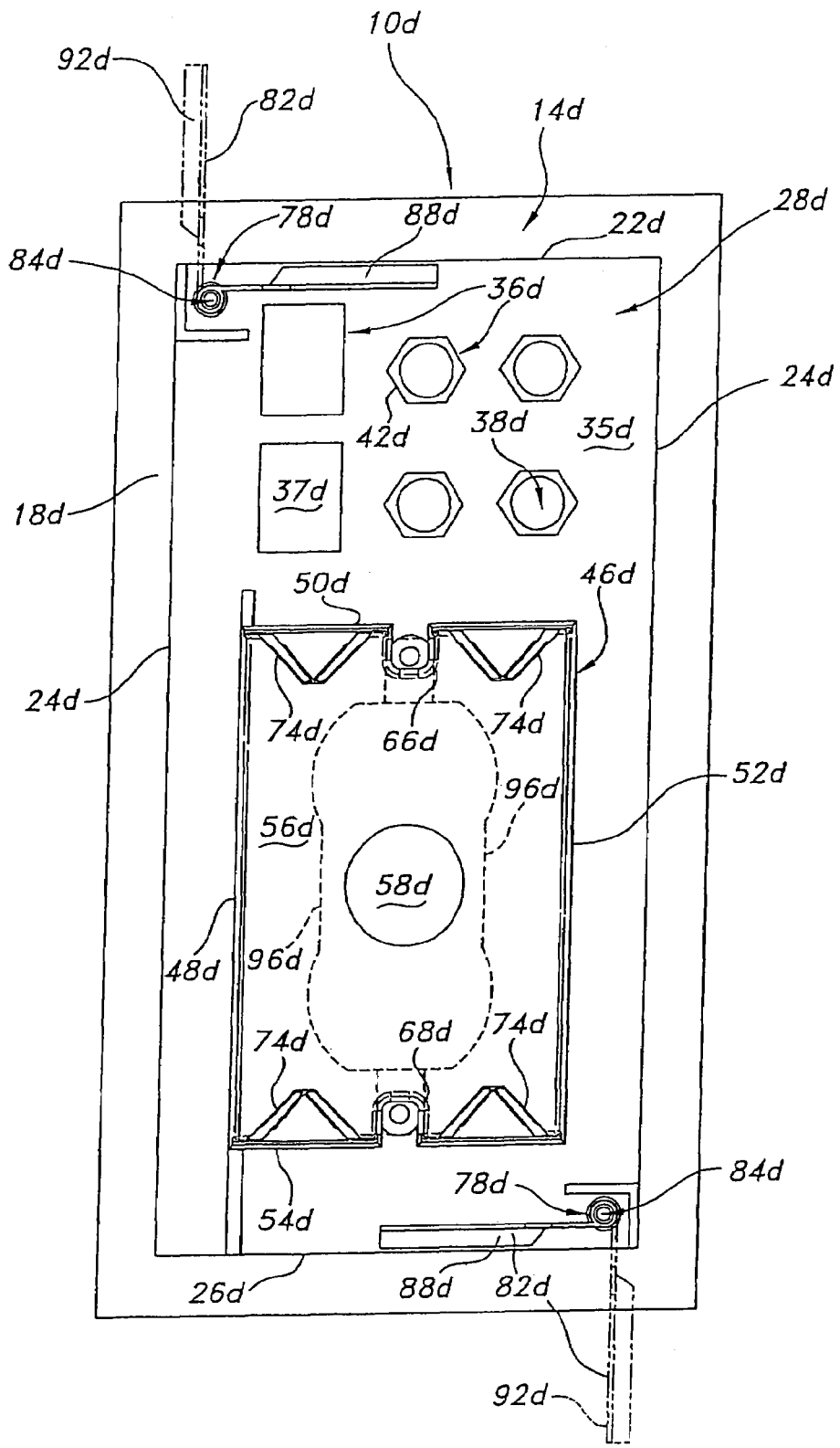
FIG. 17 is a rear elevation view of the outlet box assembly of FIG. 16 showing the arms in the retracted and clamped positions.
Figure 18:
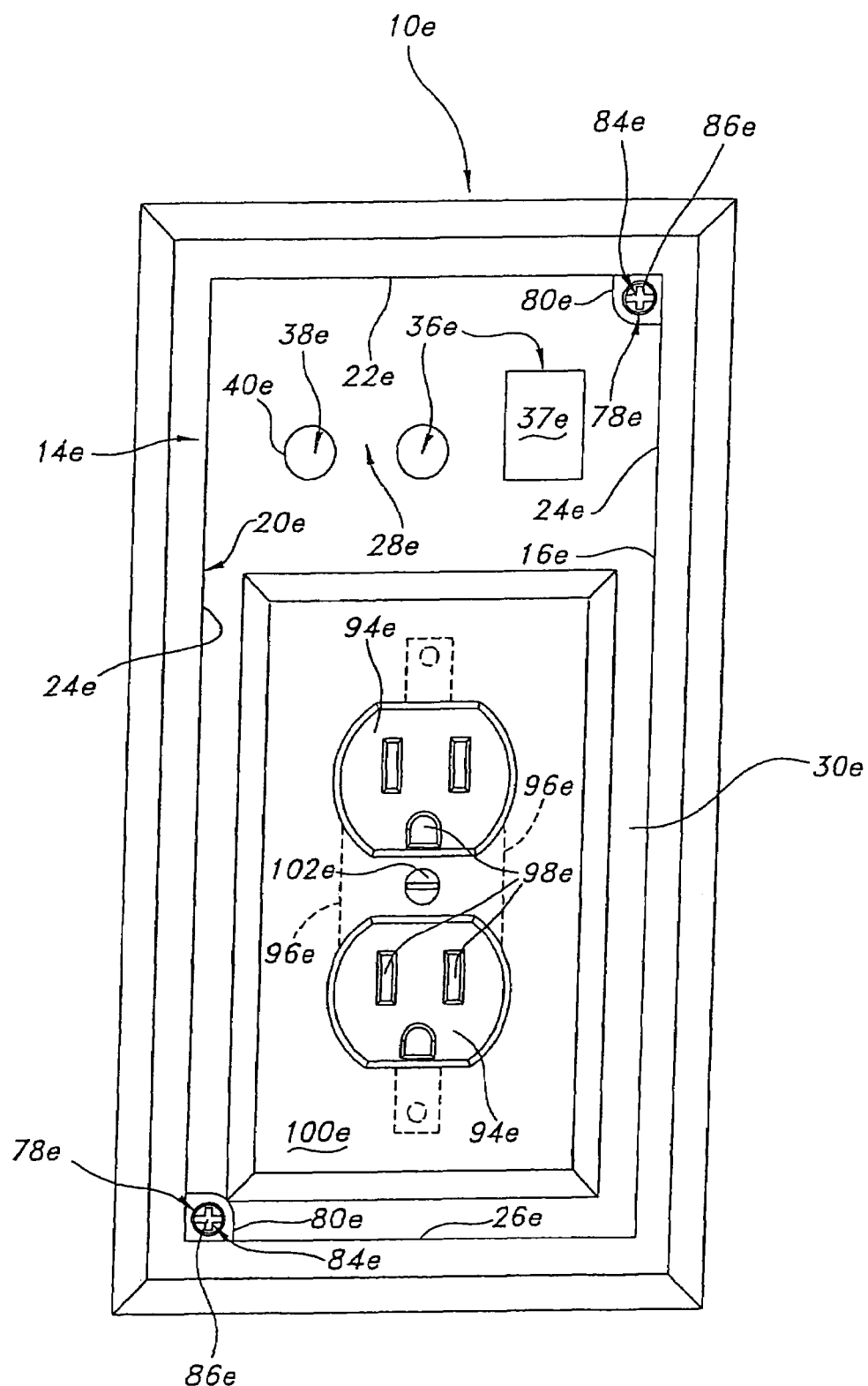
FIG. 18 is a front elevation view of an alternative sixth embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 19:
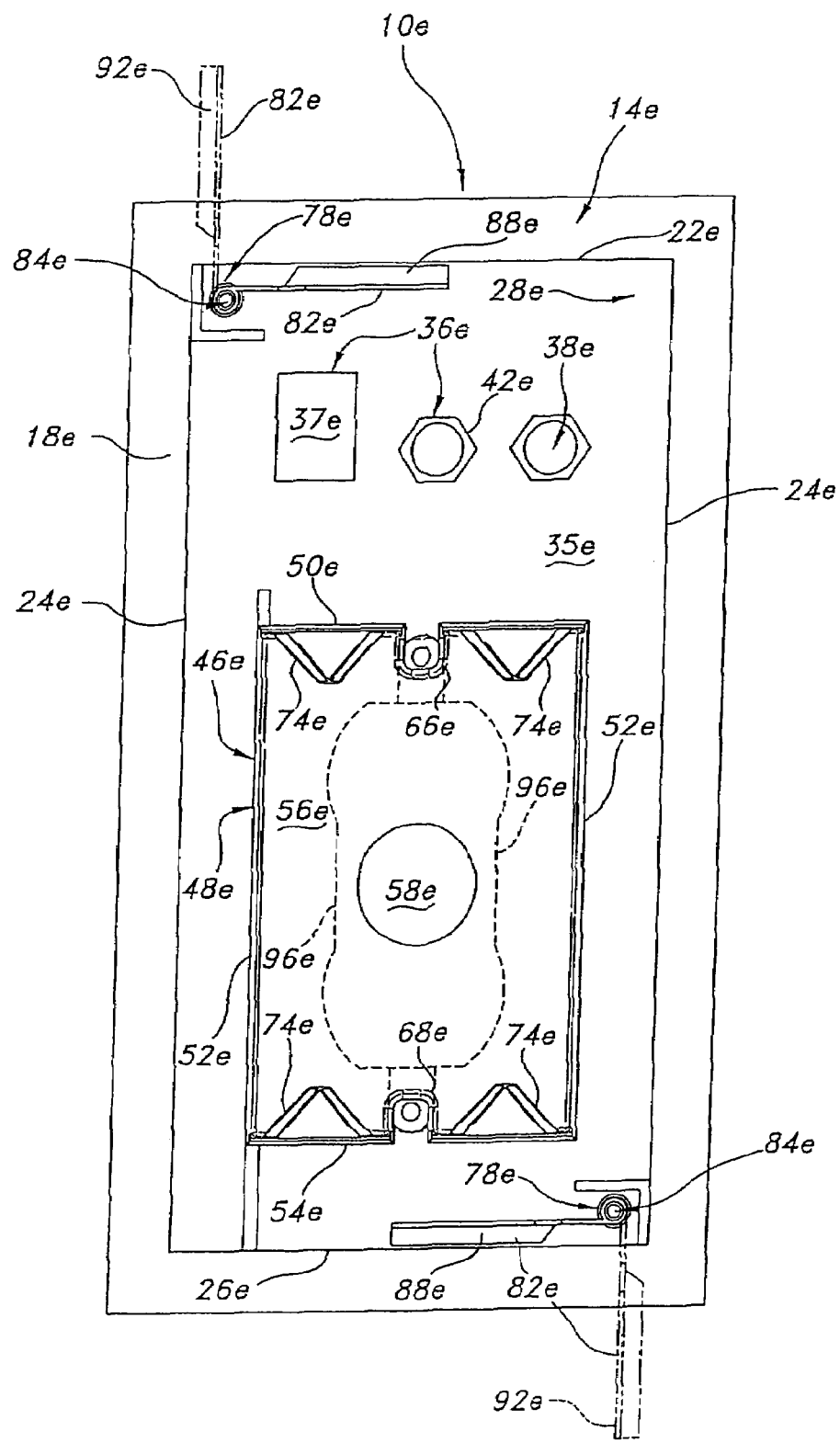
FIG. 19 is a rear elevation view of the outlet box assembly of FIG. 18 showing the arms in the retracted and clamped positions.

The cross-sections of the communication ports 36 may vary in shape to be compatible with the connectors to be supported therein. For example, as shown FIG. 8, the communication ports 36 may include rectangular communication ports 37 each of which has a rectangular cross-section. The communication ports 36 may further include circular/hexagonal communication ports 38 each of which has a forward end 40 which intersects the front surface 30 of the inner faceplate 28, as shown in FIG. 9. Each forward end 40 has a circular cross-section. The circular/hexagonal communication ports 38 each have a rear end 42 which intersects the rear surface 35 of the inner faceplate 28, as shown in FIG. 9. Each rear end 42 has a hexagonal cross-section.

Figure 3:
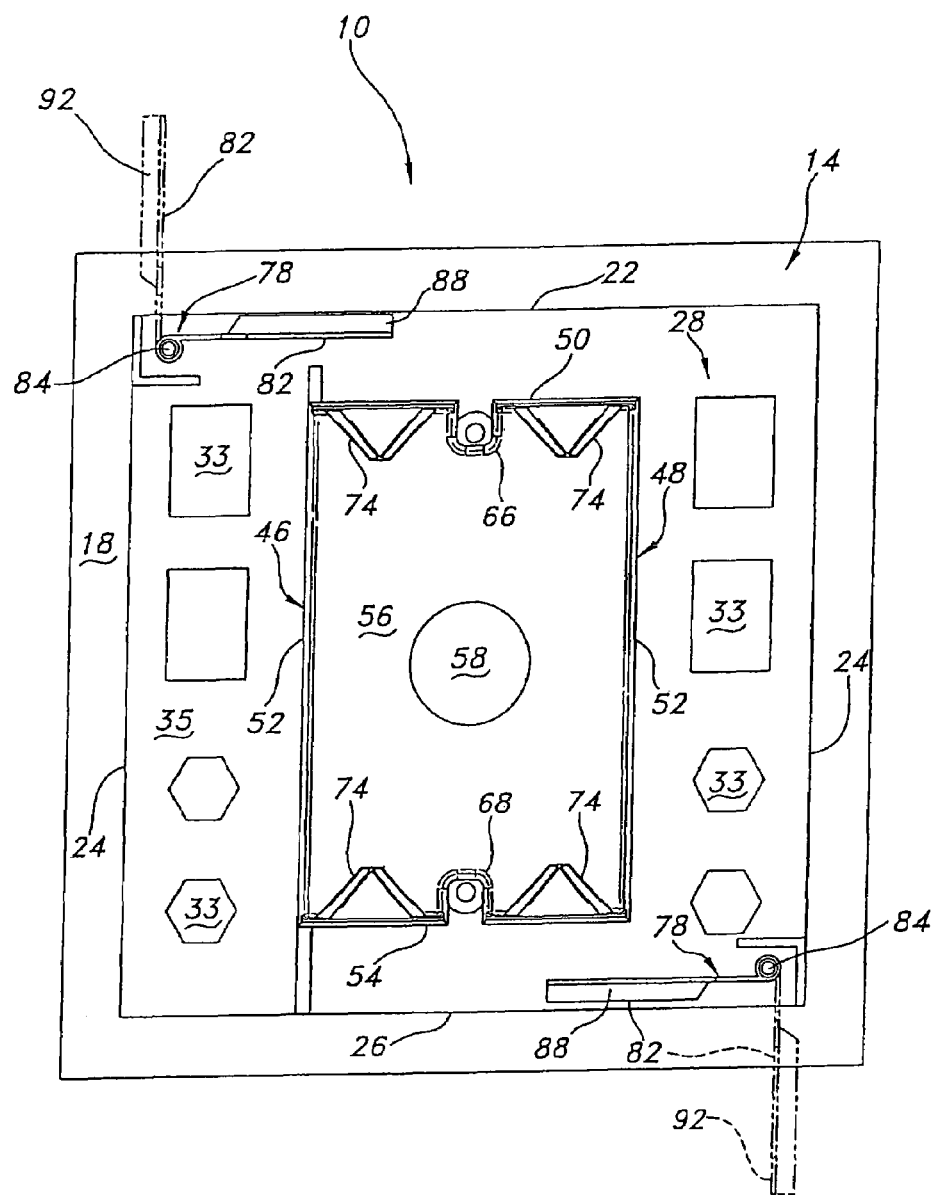
FIG. 3 is a rear elevation view of the outlet box assembly of FIG. 1 showing the arms in the retracted and clamped positions.

Additionally, the communication ports 36 may vary in number and in configuration relative to the outlet port 31. For example, as shown in FIGS. 2 and 3, the communication ports 36 are arranged such that two of the rectangular communication ports 37 are arranged above two of the circular/hexagonal communication ports 38 in respective columns on either side of the outlet port 31.

Other configurations for the communication ports 36 are possible as shown in the alternative embodiments of FIGS. 10 to 19. Parts illustrated in FIGS. 10 to 19 which correspond to parts illustrated in FIGS. 1 to 9 have the same reference numeral as in FIGS. 1 to 9 with the addition of the suffix "a" in FIGS. 10 and 11, suffix "b" in FIGS. 12 and 13, suffix "c" in FIGS. 14 and 15, suffix "d" in FIGS. 16 and 17, and suffix "e" in FIGS. 18 and 19.

Figure 4:
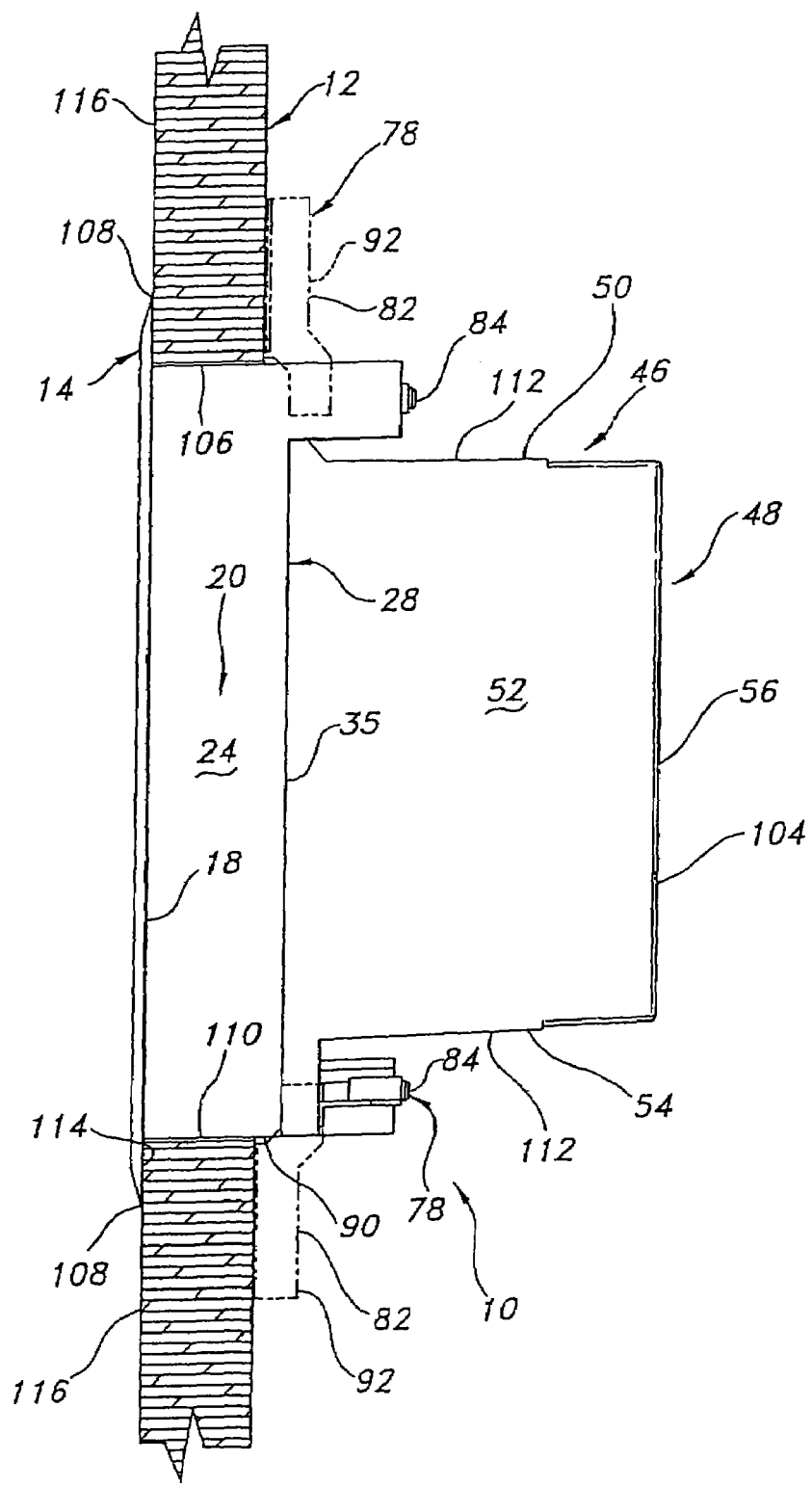
FIG. 4 is a right side elevation view of the outlet box assembly of FIG. 1 showing the arms in the clamped positions.
Figure 5:
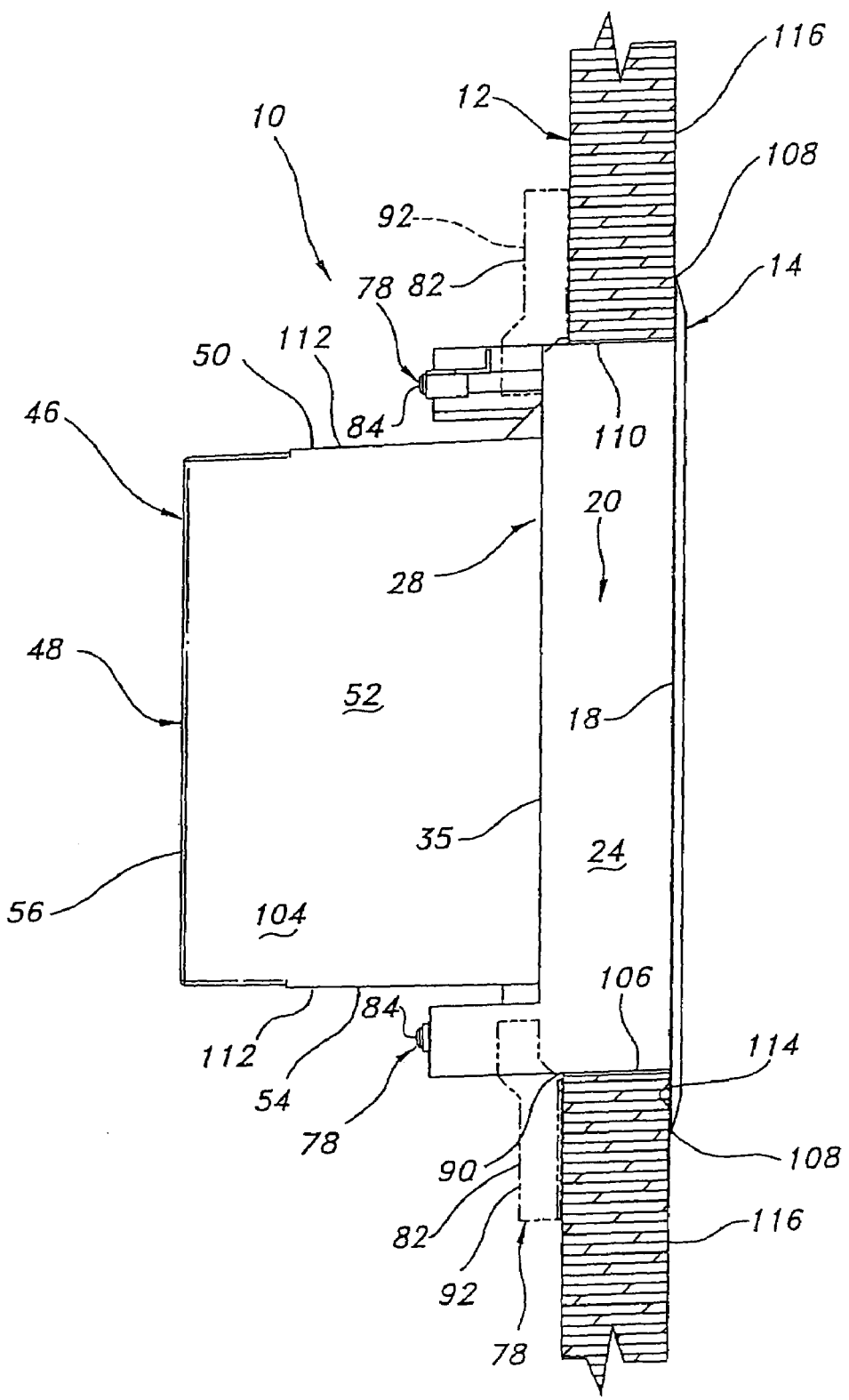
FIG. 5 is a left side elevation view of the outlet box assembly of FIG. 1 showing the arms in the clamped positions.
Figure 6:
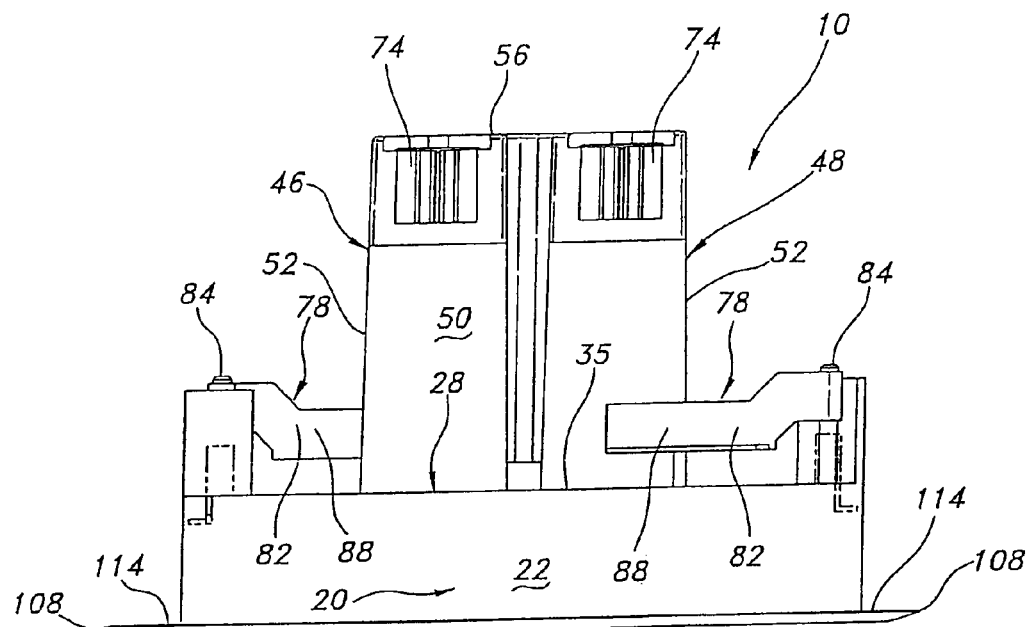
FIG. 6 is a top plan view of the outlet box assembly of FIG. 1.
Figure 7:
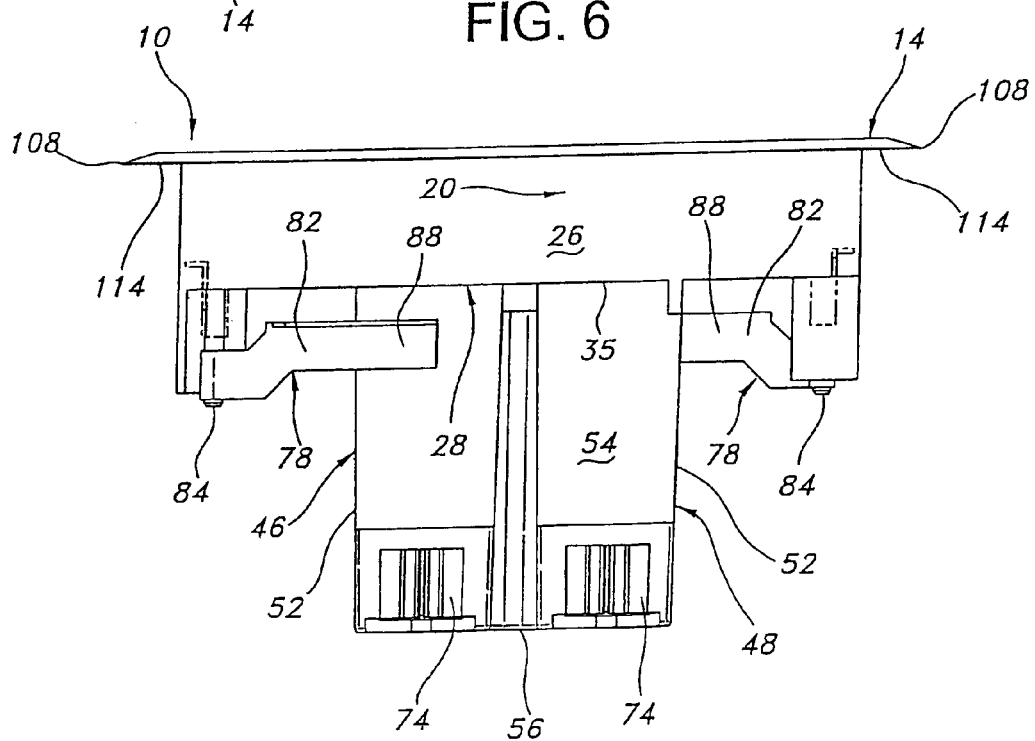
FIG. 7 is a bottom plan view of the outlet box assembly of FIG. 1.

Referring now to FIGS. 1, 4 and 5, the outlet box assembly 10 includes a support housing 46 having an outlet box 48 including a top wall 50, a pair of side walls 52, and a bottom wall 54 each of which has a front edge which is fixed to the rear surface 35 of the inner faceplate 28 such that the top, side and bottom walls are perpendicular to the inner faceplate 28. The top wall 50, side walls 52 and bottom wall 54 are fixed to one another such that each of the side walls is between the top and bottom walls in perpendicular relation thereto. This results in the outlet box 48 having a vertical cross-section which is rectangular.

The outlet box 48 includes a rear wall 56 fixed to the rear edges of the top wall 50, side walls 52 and bottom wall 54 such that the top, side and bottom walls are between the rear wall and inner faceplate 28 and the rear wall 56 is parallel to the inner faceplate 28. The rear wall 56 has a dome-shaped protrusion 58 extending inwardly from the front surface thereof and a corresponding indentation on the rear surface of the rear wall. Elongate support ribs 60 are secured to the front surface of the rear wall 56. The support ribs 60 bisect the front surface both horizontally and vertically and intersect the dome-shaped protrusion 58. The dome-shaped protrusion 58 and support ribs 60 provide structural support to the rear wall 56.

The top wall 50, side walls 52, bottom wall 54, and rear wall 56 each have an inner surface each of which defines a portion of the inner surface 62 of the support housing 46. The inner surface 62 bounds an interior region 64 of the support housing 46. Access to the interior region 64 is provided by the outlet port 31.

The support housing 46 includes an upper shoulder 66 which extends downwardly from the lower surface of the top wall 50, and a lower shoulder 68 which extends upwardly from the upper surface of the bottom wall 54. The upper and lower shoulders 66, 68 are formed by elongate recesses in the upper surface of the top wall 50 and lower surface of the bottom wall 54, as shown in FIG. 3. The upper and lower shoulders 66, 68 are perpendicular to the plane of the inner faceplate 28 and are equidistant from the side walls 52.

The inner faceplate 28 has upper and lower tab portions 70, 72 which extend downwardly and upwardly, respectively, to cover the forward ends of the upper and lower shoulders 66, 68. Each of the tab portions 70, 72 has an opening through which an elongate fastener may be inserted.

The top and bottom walls 50, 54 each have a pair of notches 74 at the corners formed by the intersection of the rear wall 56 with the top wall 50, side walls 52 and bottom wall 54. The forward ends of the notches 74 terminate at wire ports 76.

The outlet box assembly 10 includes a pair of clips 78 each of which has a post 80 and an arm 82 pivotally connected to the post in perpendicular relation thereto. Each post 80 is connected to the front surface 30 of the inner faceplate 28 adjacent to opposing corners thereof, as shown in FIGS. 1 and 2. Each of the arms 82 is coupled to an elongate member, such as a pin 84, which extends through an elongate cavity in the post 80, as shown in FIGS. 2 and 3. The forward end of the pin 84 has a head 86 to which may be coupled a tool for rotating the pin. Such coupling may be provided, for example, by forming in the front surface of the head 86 a recess which may be engaged by a screw driver. Rotation of the pin 84, such as by a screw driver, causes arm 82 to pivot about the associated post 80. Each of the arms 82 may be thereby swung between a retracted position 88 in which the arm is within the outer periphery 90 of the inner faceplate 28 and a clamped position 92 in which the arm extends beyond the outer periphery 90.

The outlet box assembly 10 is prepared for mounting to the wall structure 12 by removing the knockouts 33, such as by applying a force thereto which is sufficient to fracture the knockouts from the inner faceplate 28. Such fracturing will occur along the grooves 34 resulting in the cross-sections of the communication ports 36 having the specific shapes shown in FIGS. 2, 3, and 10 to 19. Alternatively, the knockouts 33 may be removed by cutting the outer peripheries thereof at the grooves 34. Knockouts 33 which are removed by such cutting may be referred to as cutouts.

The preparation of the outlet box assembly 10 for mounting to the wall structure 12 further includes assembling an electrical receptacle 94 to the outlet box assembly. Such assembly may be either before or after the removal of the knockouts 33 from the inner faceplate 28.

The electrical receptacle 94 is assembled to the outlet box assembly 10 by insertion of the electrical receptacle 94 through the interior opening 16 and outlet port 31 into the interior region 64 of the support housing 46. The electrical receptacle 94 has an outer surface 96 and elongate slots 98 to receive the prongs of an electrical plug. When the electrical plug is inserted into the electrical receptacle 94, at least a portion of the plug or possibly the entire plug is contained within the flange structure 20.

The wire ports 76 provide a pathway for wires to extend from the electrical receptacle 94 within the interior region 64 to a location outside of the support housing 46. Provision of the wire ports 76 at the top and bottom walls 50, 54 accommodates wires which are connected to the top or bottom of the electrical receptacle 94, typically to the rear thereof. Such wires typically extend to the power source for the provision of electrical power to the electrical receptacle 94. This results in electrical power being supplied to an electrical plug inserted in the electrical receptacle 94.

The insertion of the electrical receptacle 94 into the interior region 64 is facilitated by the configuration of the support housing 46. For example, the configuration of the support housing 46 provides for a clearance between the inner surface 62 and the outer surface 96 of the electrical receptacle 94.

The electrical receptacle 94 is secured to the support housing 46 by a pair of elongate fasteners, such as screws, which extend through the upper and lower flanges of the electrical receptacle and through the upper and lower tab portions 70, 72 of the inner faceplate 28 to clamp together the respective tab portions and flanges.

The electrical receptacle 94 has a central bore into which an elongate fastener may be inserted. Such a fastener may be a screw the threads of which correspond to the threaded inner surface of the central bore. An interior faceplate 100 is secured to the front surface of the electrical receptacle 94 by the screw 102 extending through a central opening in the faceplate and into the central bore in the electrical receptacle. The interior faceplate 100 is planar and has an outer edge which may be beveled. The interior faceplate 100 is parallel to the outer and inner faceplates 14, 28 when the interior faceplate is secured to the electrical receptacle 94.

The outlet box assembly 10 is mounted to the wall structure 12 initially by orienting the assembly such that the outer and inner faceplates 14, 28 are vertical and the outer surface 104 of the rear wall 56 faces the opening 106 in the wall structure 12. The outer periphery 108 of the outer faceplate 14 extends beyond the periphery 110 of the opening 106 in the wall structure 12. The outer periphery 90 of the inner faceplate 28 is within the periphery 110. The outer vertical periphery 112 of the support housing 46 is within the outer periphery 90 of the inner faceplate 28. The outer vertical periphery 112 is contained in a plane which is parallel to the front surface 30 of the inner faceplate 28. The relative sizes of the peripheries 90, 112 allow the insertion of the inner faceplate 28 and support housing 46 through the opening 106. Before such insertion, the arms 82 are swung to the retracted positions 88 by rotating the associated pins 84, such as by engaging the heads 86 with a screw driver. When the arms 82 are in the retracted positions 88, the arms do not obstruct insertion of the inner faceplate 28 through the opening 106 in the wall structure 12. Accordingly, with the arms 82 in the retracted positions 88, the support housing 46 and inner faceplate 28 are inserted through the opening 106 in the wall structure 12.

The relative sizes of the peripheries 108, 110 of the outer faceplate 14 and opening 106 result in the inner surface 114 of the outer faceplate 14 squarely contacting the outer surface 116 of the wall structure 12 adjacent to the opening 106. The thickness of the outer faceplate 14 and longitudinal position of the arms 82 on the respective posts 80 results in the arms being to the rear of and adjacent to the wall structure 12 when the outer faceplate 14 squarely contacts the outer surface 116. This relative positioning of the arms 82 and the wall structure 12 allows the arms to be swung to the clamped positions 92 when the outer faceplate 14 squarely contacts the outer surface 116.

Following insertion of the support housing 46 and inner faceplate 28 into the opening 106 in the wall structure 12 such that the outer faceplate 14 squarely contacts the outer surface 116, the arms 82 are swung to the clamped positions 92 by rotating the associated pins 84, such as by engaging the heads 86 with a screw driver. Moving the arms 82 to the clamped positions 92 results in the wall structure 12 being clamped between the arms and the outer faceplate 14. This clamping obstructs forward retraction of the inner faceplate 28 through the opening 106 in the wall structure 12.

The clamping of the outer faceplate 14 against the outer surface 116 results in the flange structure 20 being within the opening 106. As a result, when the electrical plug is inserted into the electrical receptacle 94, at least a portion of the plug or possibly the entire plug is recessed from the outer surface 116.

The outlet box assembly 10 may be released and retracted from the opening 122 in the wall structure 12 by swinging the arms 82 to the retracted positions 88 by rotating the associated pins 84, such as by engaging the heads 86 with a screw driver. When the arms 82 are in the retracted positions 88, they do not obstruct forward retraction of the inner faceplate 28 through the opening 106 in the wall structure 12.

In an alternative embodiment of the outlet box assembly 10, it is possible for an inner faceplate corresponding to the inner faceplate 28 to be inclined relative to an outer faceplate corresponding to the outer faceplate 14. This inclination provides for both the outer and inner faceplates to have a vertical orientation when the alternative outlet box assembly is mounted on the wall structure 12. This mounting of the alternative outlet box assembly further provides for the inner faceplate to face in a direction which is inclined relative to an outlet port corresponding to the outlet port 31.

The inclination between the outer and inner faceplates may be provided by connecting one of the side edges of the inner faceplate 28 to the rear surface of the outer faceplate 14 such that the inner faceplate is inclined relative to the outer faceplate. In such a configuration, a flange structure corresponding to the flange structure 20 would include a rear wall having one side edge connected to the rear edge of the inner faceplate. The flange structure would further include top and bottom walls extending between the outer faceplate and rear wall. The flange structure would also have a side wall extending between the outer faceplate and side edge of the rear wall which is opposite to the inner faceplate.

This alternative embodiment includes an outlet box corresponding to the outlet box 48 connected to the rear surface of the inner faceplate in which an electrical receptacle corresponding to the electrical receptacle 94 is mounted. An interior faceplate corresponding to the interior faceplate 100 is secured to the front surface of the electrical receptacle.

In this alternative embodiment of the outlet box assembly, communication ports corresponding to the communication ports 36 may be contained in the rear wall. The communication ports may vary in number and cross-sectional shape. For example, the communication ports may be arranged such that two of the communication ports correspond to the rectangular communication ports 37 and are arranged above another two of the communication ports which correspond to the circular/hexagonal communication ports 38. The four communication ports may be arranged in a column located adjacent to the side edge of the rear wall which is opposite to the inner faceplate.

The inclination of the inner faceplate relative to the outer faceplate may provide for a larger portion of an electrical plug connected to the electrical receptacle to be recessed within the flange structure. This results in a larger portion of the electrical plug being recessed within the wall structure when the outlet box assembly is mounted therein. Also, the inclination may provide for the recess within the flange structure and, consequently the wall structure, of a larger portion of a cable plug connected to a receptacle supported in the communication port.

With reference to FIGS. 20-30, an alternative embodiment of the outlet box assembly is shown. Outlet box assembly 128 can accommodate electrical of the type receptacles connected to relatively high line voltage, e.g. 110V or 220V, such as duplex outlets, and also accommodate low voltage receptacles such as telecommunication/data connectors. Outlet box assembly 128 is preferably used in indoor applications.

With reference to FIGS. 20-23, the outlet box assembly 128 includes an outlet box 130 having a bottom wall 132 peripherally bounded by a perimeter wall 131 forming a box interior 133. The perimeter wall 131 includes a first and second side wall 134 and 136, and a first and second end wall 138 and 140. The first and second end walls 138 and 140 extend from the bottom wall 132 in a generally straight manner to a box upper end 146. The bottom wall 132 and side walls, 134 and 136, and end walls 138 and 140, form a housing 142 for an electrical receptacle 144, such as a duplex electrical outlet. Electrical receptacle 144 may be operably connected to wiring carrying line voltage. The bottom and perimeter walls may include knockouts 145 to create wire entry ports into the box interior 133.

The outlet box 130 is preferably integrally formed of a plastic material which may be molded in a manner well known in the art. It is also within the contemplation of the present invention that the outlet box 130 may be formed of other types of materials using different manufacturing processes.

Figure 22:
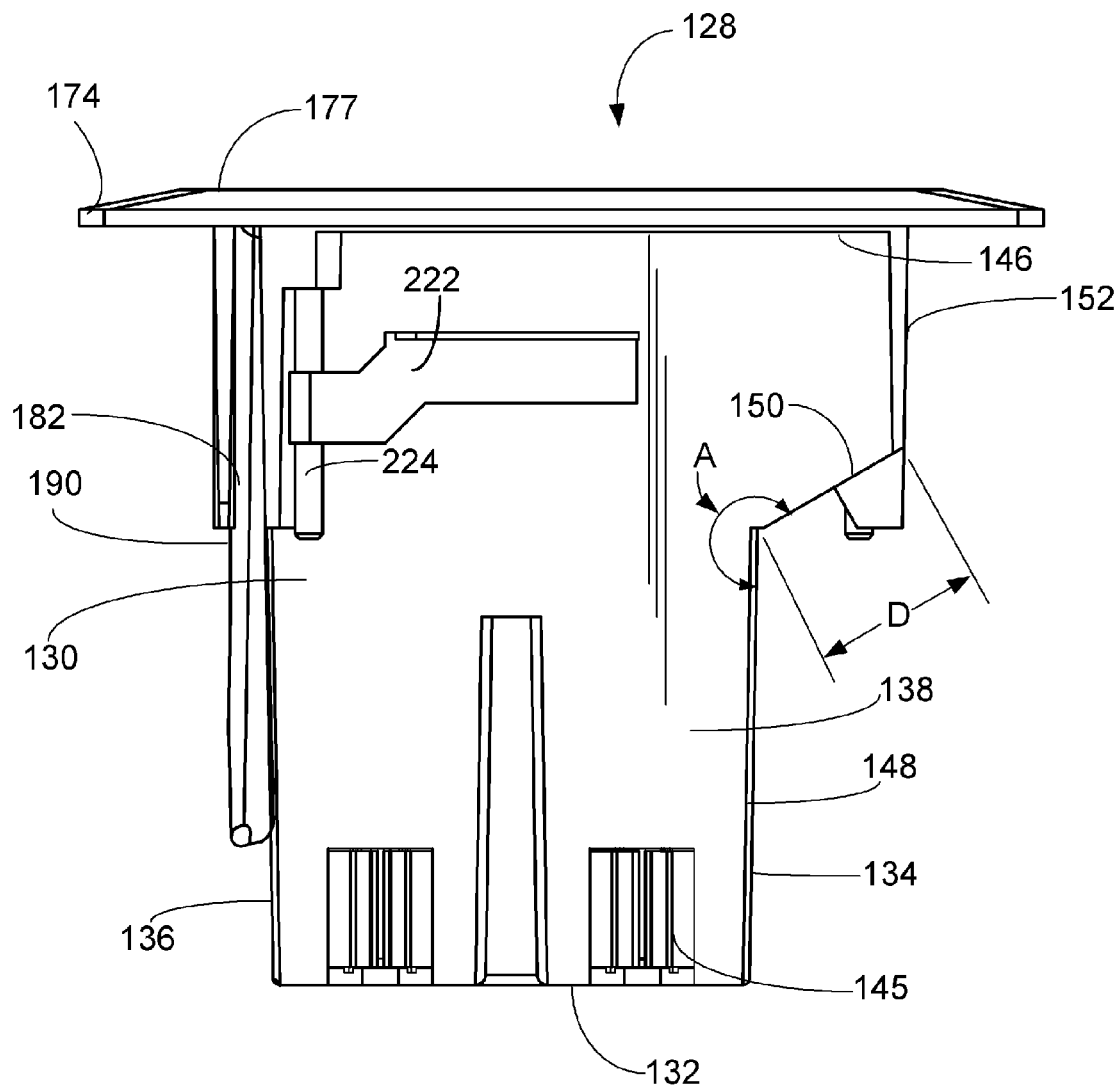
FIG. 22 is an end elevation view of the outlet box assembly of FIG. 20 with the cover in the retracted position.

Referring to FIG. 22, in a preferred embodiment, first side wall 134 has a first portion 148 that extends from the bottom wall 132 in a direction generally perpendicular to the bottom wall. The first side wall has a second portion 150 extending outwardly from the wall first potion 148 at an angle A for a distance D. The angle may be in the range of approximately 90° to 180°. The angle may be an oblique angle and may preferably be about 120° although other angle values are contemplated by the invention. The first side wall has a third portion 152 that extends from the second portion 150 at an oblique angle to the upper end 146 of the box. The third portion 152 is generally parallel to the opposed second side wall 136.

Figure 21:
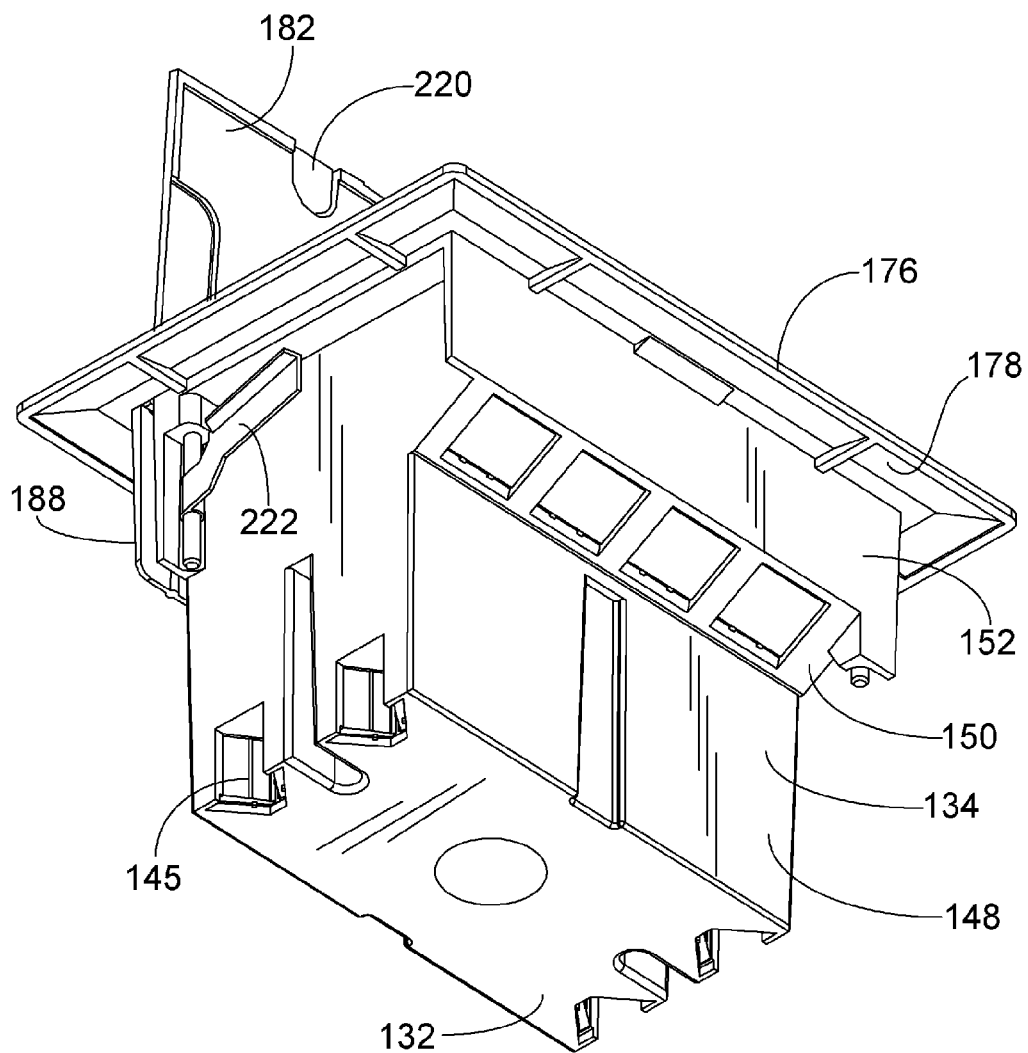
FIG. 21 is a bottom perspective view of the outlet box assembly of FIG. 20.
Figure 23:
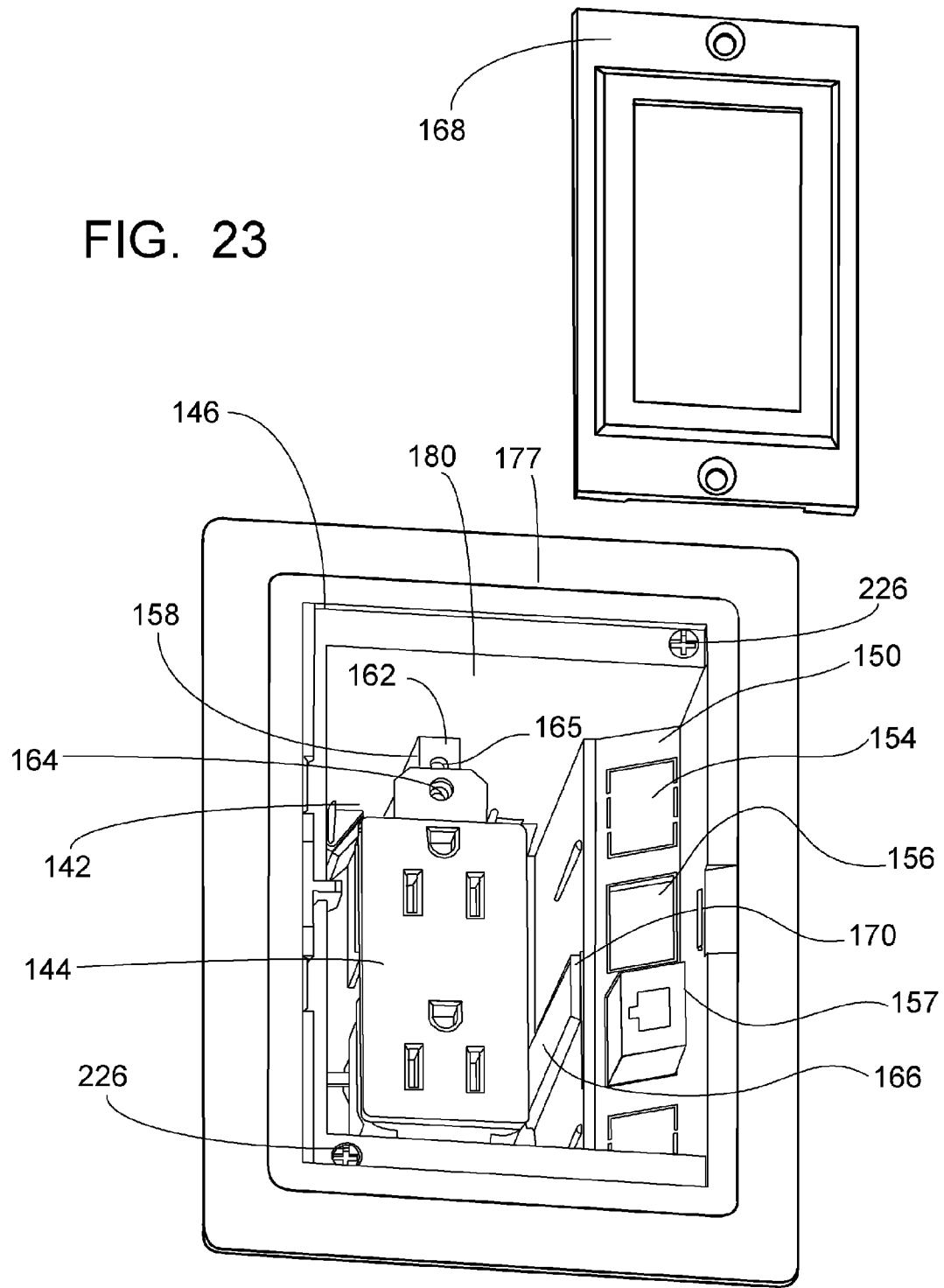
FIG. 23 is an exploded perspective front view of the outlet box assembly of the present invention showing electrical receptacles and cover plate.

As shown, for example, in FIGS. 21 and 23 the first side wall second portion 150 may include a plurality of knockouts 154 formed in a manner as described with respect to the previously describe embodiments. The knockouts 154 when removed from the wall portion 150 form communication/data ports 156. The communication/data ports 156 provide openings for communication and data receptacles 157, FIGS. 23 and 29. The wiring 159 for the receptacles 157 extends from the receptacles past the first side wall second portion 150. Therefore, the wiring is isolated from housing 142. Accordingly, the outlet box 130 is capable of supporting both line voltage receptacles and communication/data receptacles. The first side wall second portion 150 is disposed a distance from the box upper end 146 such that data receptacles 157 are recessed when installed in ports 156.

Figure 20:
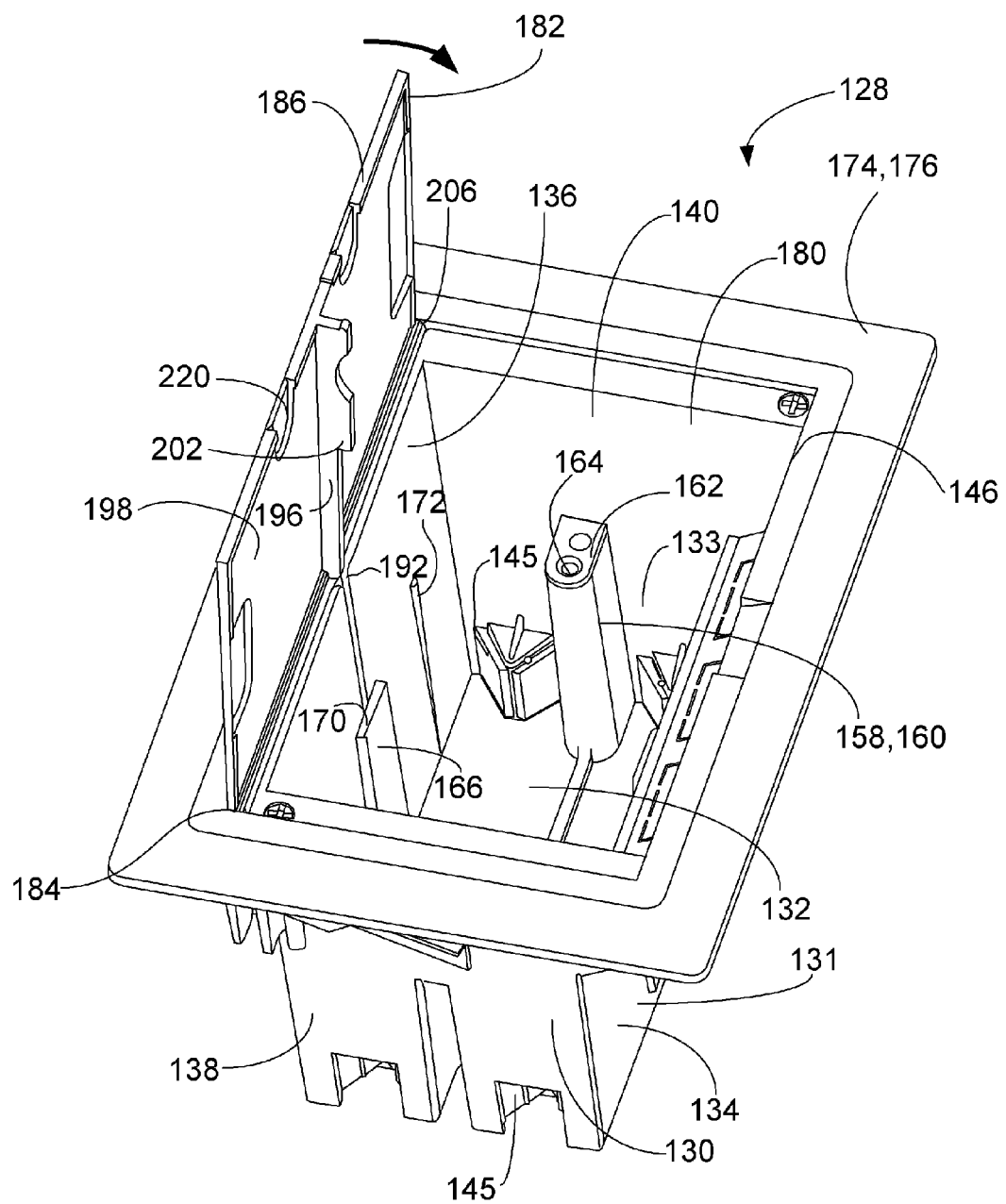
FIG. 20 is a front perspective view of a further alternative embodiment of the outlet box assembly of the present invention.
Figure 24:
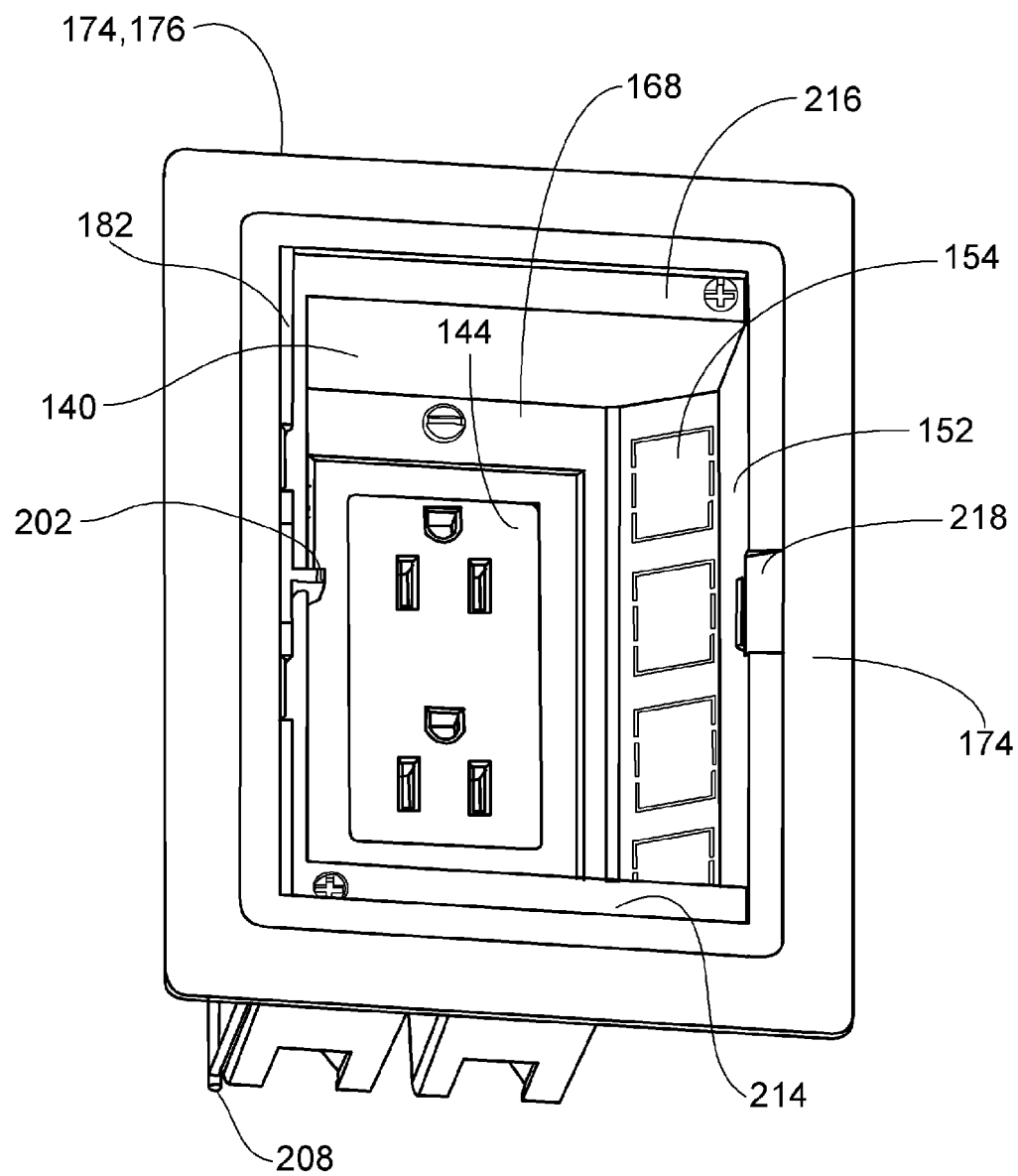
FIG. 24 is a perspective front view of the outlet box assembly showing a receptacle and cover plate.

Referring to FIGS. 20, 23 and 24, housing 142, which receives an electrical receptacle 144, may include an attachment structure 158 for securing the receptacle 144 to the outlet box 130. Attachment structure may include a pair of posts 160 (FIG. 20) disposed adjacent first and second end walls 138, 140. Posts 160 may extend upwardly from bottom wall 132 and be secured to their respective end walls. Posts 160 may be integrally formed with the outlet box 130. Posts 160 each have an upper surface 162 which includes at least one first mounting hole 164 for receiving a fastener for securing the receptacle 144. When the receptacle is secured, it preferably lies in a first plane generally parallel to the upper end 146 of the outlet box or the bottom wall 132. This first plane preferably is angularly offset from a second plane formed by the first side wall second portion 150.

Figure 28:
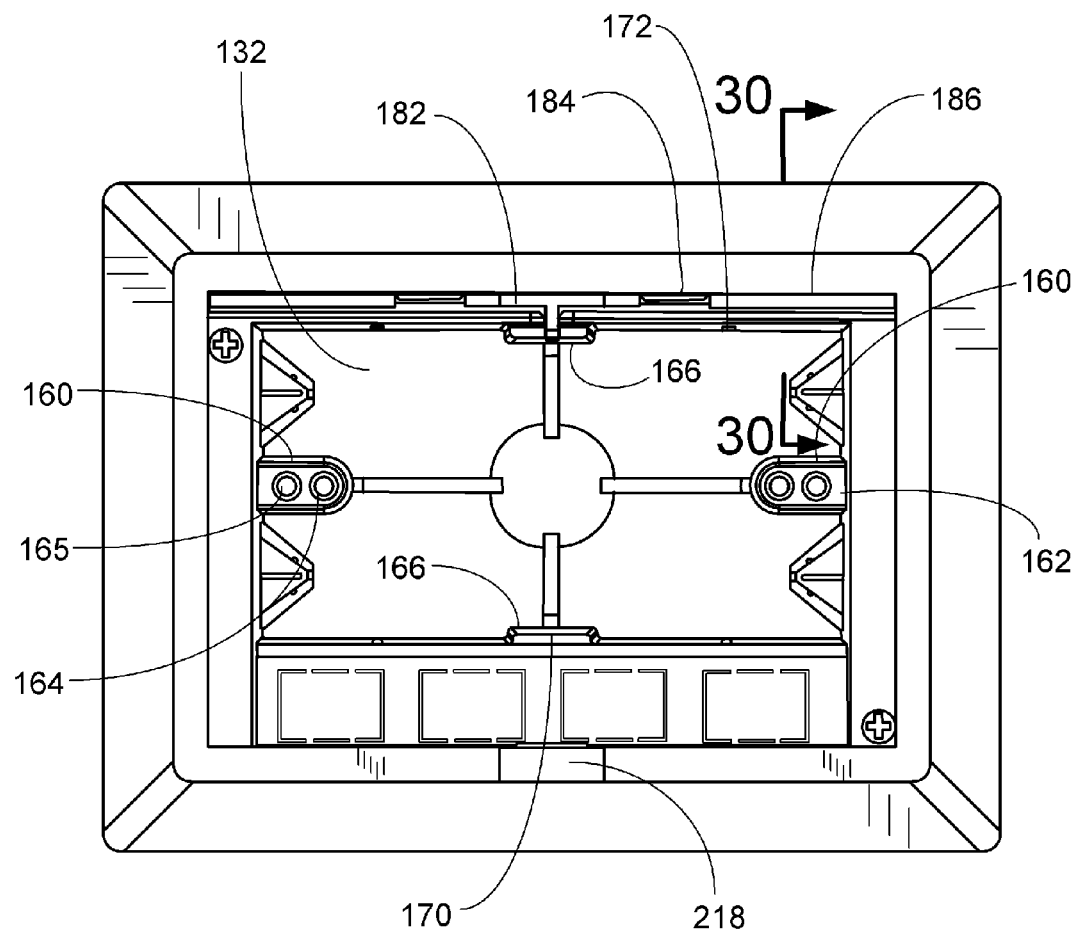
FIG. 28 is a front plan view of the outlet box assembly showing the cover in the retracted position.

With reference to FIGS. 23, 24 and 28, post upper surface 162 may include at least one second mounting hole 165 for securing a cover plate 168. Cover plate 168 may cover the housing 142 such that wiring connected to the receptacle 144 is isolated from the remainder of the outlet box interior. Upper surface 162 is disposed a distance from the outlet box upper end 146 such that the electrical receptacle 144 is recessed when secured in the outlet box. The distance may be such that the plug end of an electrical cord is contained within the outlet box when plugged into the electrical receptacle 144. While a duplex electrical outlet is shown in the figures, it is within the contemplation of the present invention that the electrical receptacle could include other components such as switches.

First and second side walls 134, 136 may include supports 166 projecting toward the box interior as shown in FIGS. 20 and 23. Supports 166 form a ledge 170 upon which the sides of the cover plate 168 may be supported. Supports 166 may be disposed generally at the longitudinal center of the first and second side walls 134, 136. On both sides of the supports 166, the first and second side walls 134, 136 may include secondary supports 172 which also support the sides of the cover plate 168. Accordingly, the cover plate 168 is supported at a plurality of locations along its length. Supports 166 and secondary supports 172 may be integrally formed with the outlet box 130 and project inwardly from the first and second side walls, 124, 136.

The side walls 134, 136, and end walls 138, 140 terminate in a perimeter extending flange 174 forming an outer face plate 176 of the outlet box. The flange 174 has a back surface 178 (FIGS. 21 and 27) that may abut a wall surface (not shown) when the outlet box assembly 128 is installed. The flange 174 defines an opening 180 into the outlet box interior 133 to provide a user with access to the various receptacles.

Figure 25:
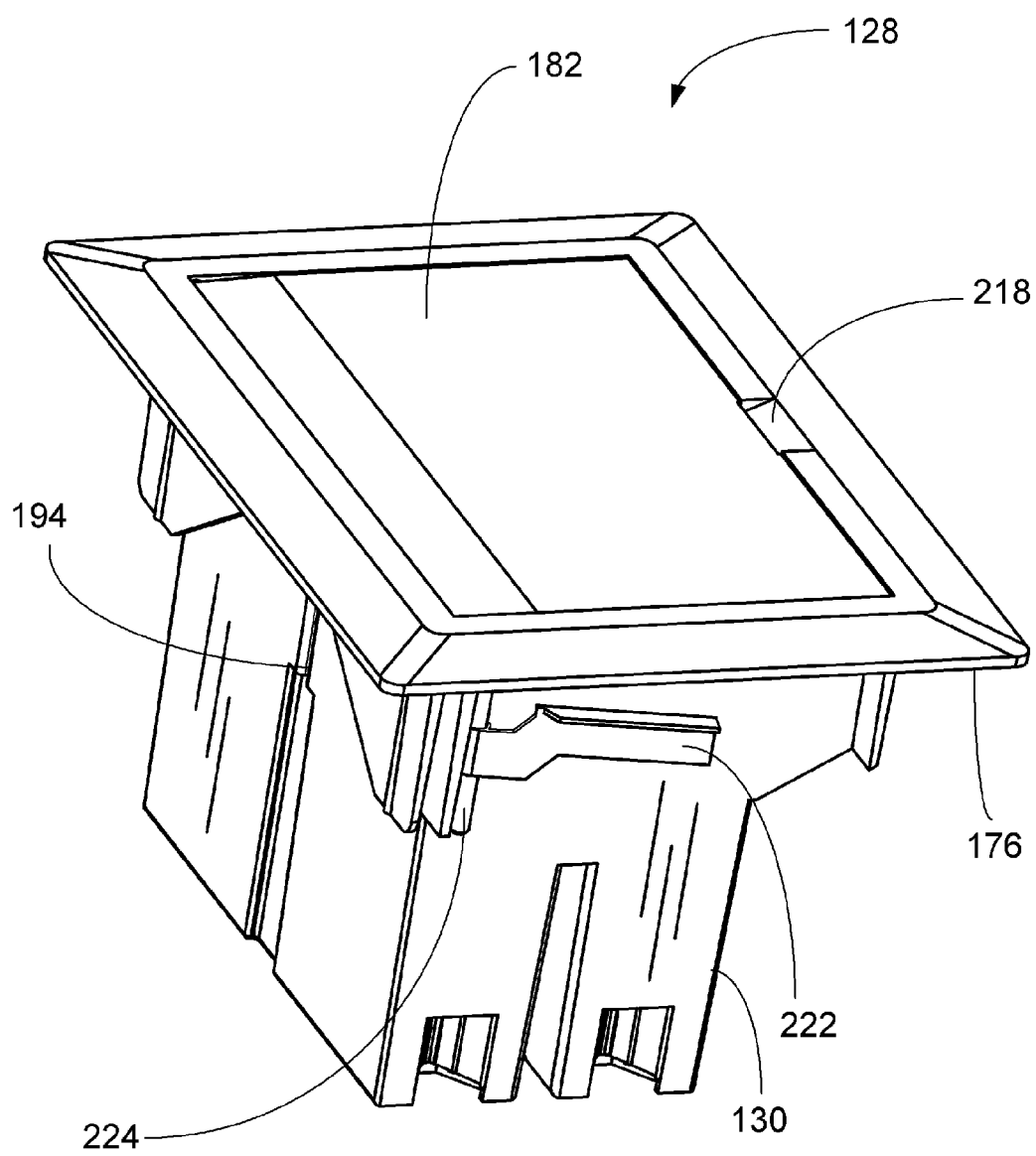
FIG. 25 is a perspective front view of the outlet box assembly of FIG. 20 showing the cover in a closed position.
Figure 26:
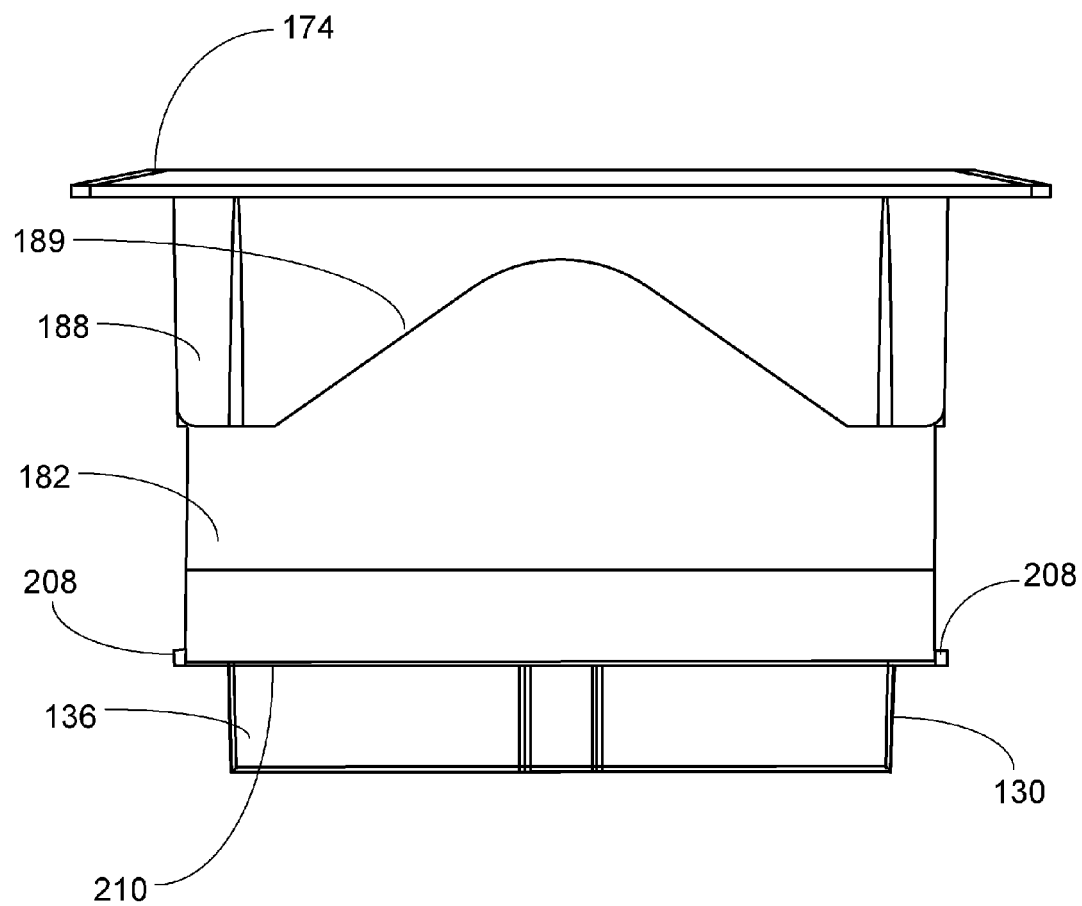
FIG. 26 is an elevation side view showing the cover in the retracted position.

With specific reference to FIGS. 20, 22 and 24-26, the outlet box assembly 128 preferably includes a cover 182 for selectively covering the opening 180. Cover 182 may be rotated between an open position shown in FIG. 20 and a closed position shown in FIG. 25. The cover 182 may also have a retracted position wherein it is disposed along second side wall 136 of the outlet box 130 when not in use as shown in FIGS. 22, 24, and 26. Therefore, when access to the receptacles 144, 157 in the outlet box 130 is desired, the cover 182 may be stored out of the way. The cover may have an un-retracted or extended position wherein it extends outwardly from the flange 174 as shown in FIG. 20. In the un-retracted position, the cover extends outwardly from outlet box 130. The cover 182 can then be rotated to the closed position or translated to the retracted position. To retract the cover 182, it is preferably brought into a position such that it is generally parallel to second side wall 136.

With reference to FIGS. 20 and 28, in order to permit the cover 182 to move between the retracted and un-retracted position, flange 174 may include a slot 184 running along the length of second side wall 136. Slot 184 may be formed by the upper end of second side wall 136 and the flange 174. Cover 182 may be a generally planer member, and slot 184 permits cover 182 to slide freely therein. In the retracted position, cover 182 is generally aligned in parallel with the second side wall 136. Additionally, a front edge 186 of the cover is generally flush with the top surface 177 of the outer face plate 176 (FIG. 22) when in the retracted position. Therefore, when the cover 182 is not in use, it creates no obstruction to access into the opening 180 and does not project beyond the outer face plate top surface 177.

Figure 30:
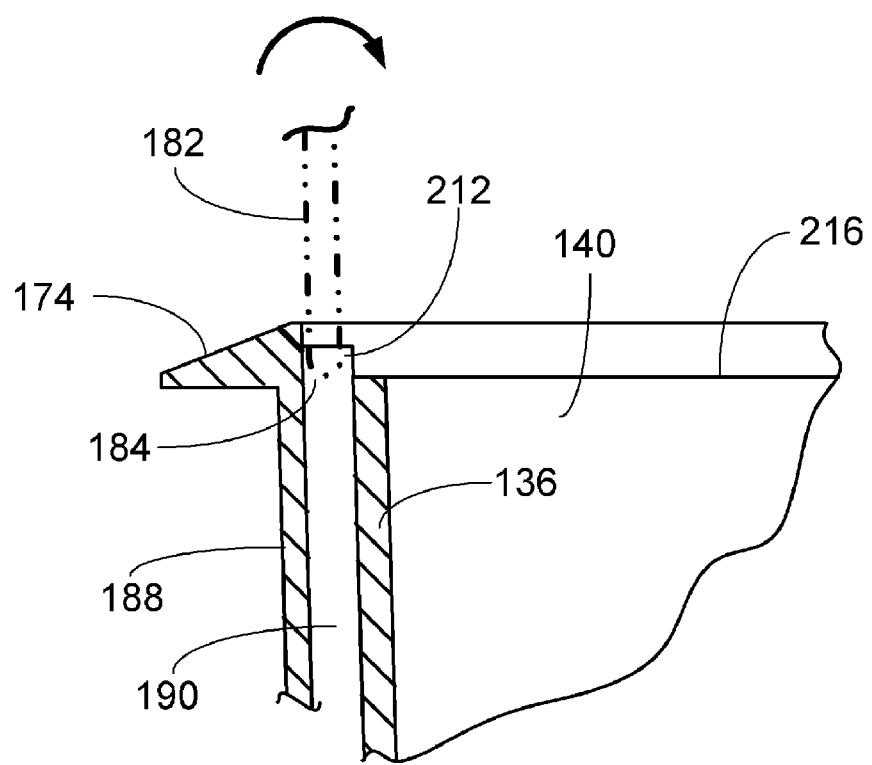
FIG. 30 is a partial cross-sectional view taken along line 30-30 of FIG. 28.

When the cover is in the retracted position it is bounded by second side wall 136 and the flange 174, thereby restricting rotational movement. As shown in FIG. 30, as the cover 182 is translated from the retracted position to the un-retracted position, the cover extends through slot 184 and above the top of second side wall 136. The cover is therefore free to rotate to the closed position covering the opening 180. The rotation may be effected by a hinge 206.

Referring to FIGS. 20, 26 and 30, hinge 206 may include posts 208 extending from the back edge 210 of the cover. The posts 208 fit within a clearance 212 located at each end of the slot 184, which extends above the top of the second side wall 136. The cover 182 may be moved to the un-retracted position where the posts 208 enter into the clearance 212 and the cover is positioned above the top of the second side wall 136. Therefore, the cooperation between the clearance 212 and posts 208 permits the cover 182 to be rotated to the closed position after it has been fully extended. The posts 208 engage the flange back surface 178, which forms the top of the clearance 212, when the cover 182 is in the fully extended position, thereby preventing the cover 182 from being separated from the outlet box 130. It is also within the contemplation of the invention that the cover could be separable from the outlet box. One way this could be achieved is by not including the posts on the cover, which would permit the cover to be slid out of and separated from the outlet box 130.

Figure 27:
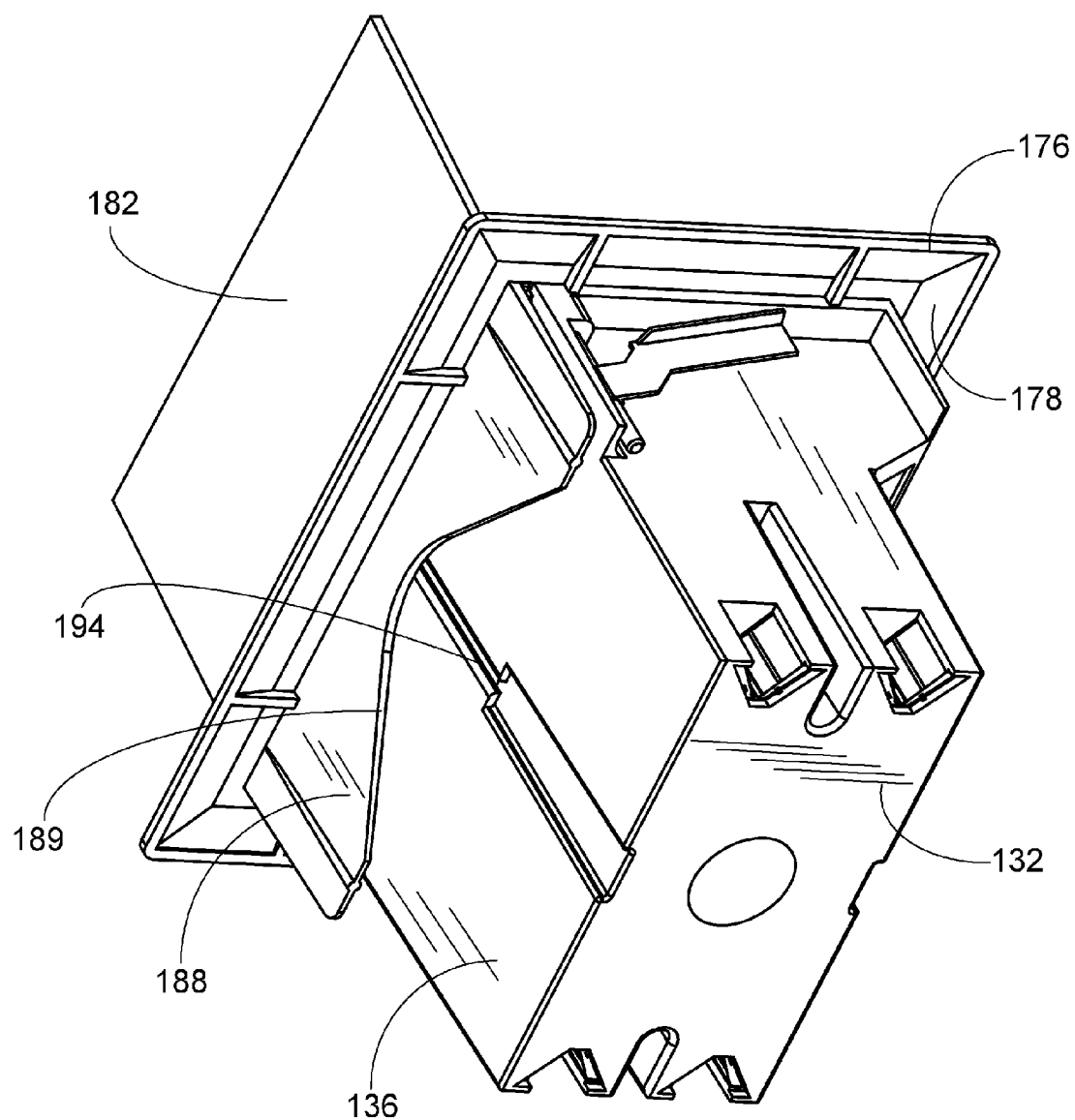
FIG. 27 is a perspective bottom view of the outlet box of FIG. 20 showing the cover in an unretracted position.

Referring to FIGS. 20 and 27, in order to govern the movement of the cover 182, a guide 192 may be provided. Guide 192 preferably includes a groove 194 extending into or through second side wall 136 and running in the direction of the cover's travel, i.e., from the outlet box upper end 146 to bottom wall 132. The guide 192 further includes a corresponding linear rail 196 extending from the cover's undersurface 198. The rail 196 rides within the groove 194 thereby maintaining the alignment of the cover as it travels to and from the retracted position, such that binding of the cover with the slot is avoided. The rail 196 includes an outwardly projecting portion forming a stop 202 which projects from the rail. Stop 202 engages the ledge 170 or the cover plate 168 supported thereon and prevents the cover 182 from sliding out of the slot when in the fully retracted position. Stop 202 also functions as a handle that a user may engage to move the cover 182 from the retracted position.

Figure 29:
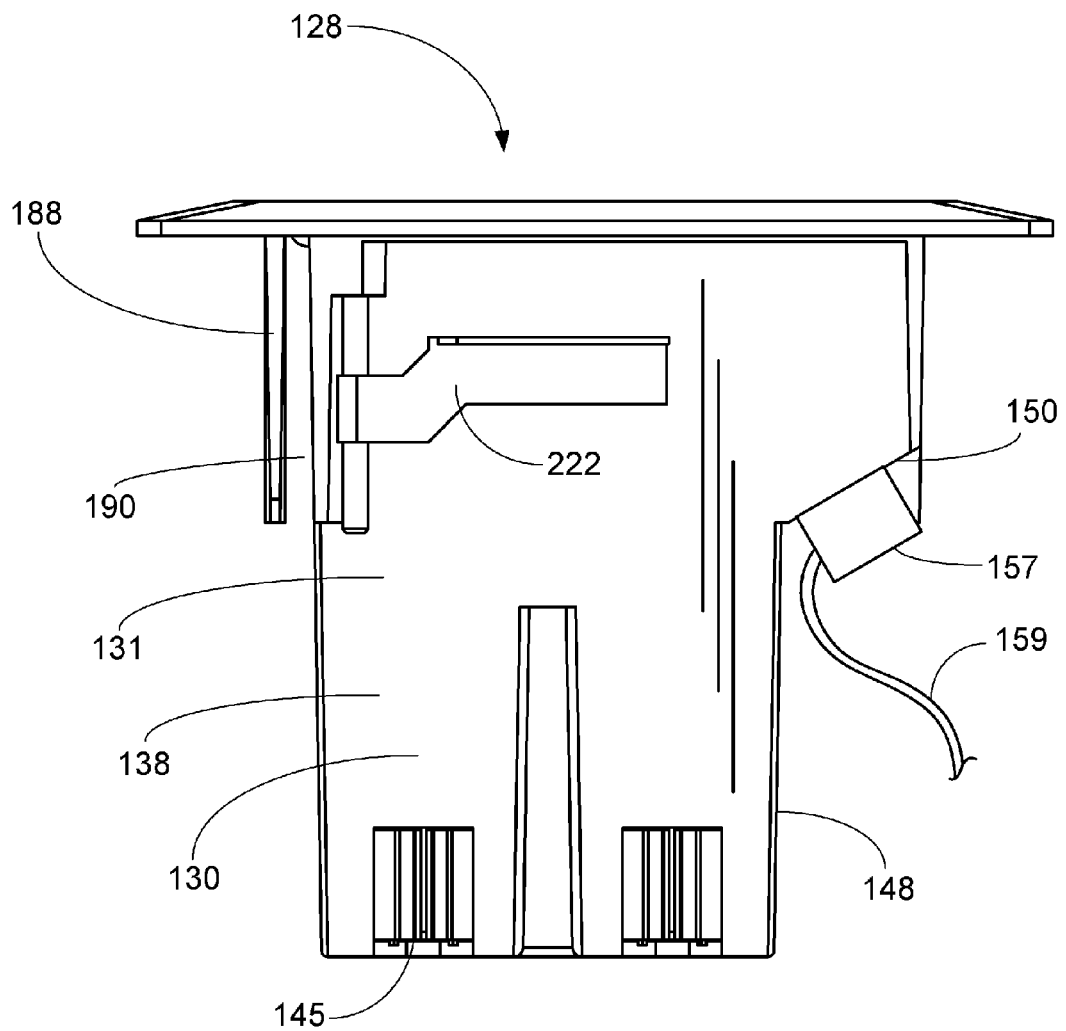
FIG. 29 is an elevation side view of the outlet box assembly with the cover in the closed position.

When cover 182 is in the retracted position as shown for example in FIGS. 22, 26 and 29, it is disposed outside of the outlet box interior and extends alongside second side wall 136. An abutment wall 188 is positioned beyond the retracted cover and separates the retracted cover from a structure when the outlet box assembly is installed. The abutment wall 188 extends downwardly from the back surface 178 of the outer face plate 176 and is spaced from second side wall 136. Abutment wall 188 may extend down from the outer face plate 176 a distance less than the length of the second side wall 136. Abutment wall 188 may have a generally V-shaped edge 189. Abutment wall 188 and second side wall 136 form a gap 190 in which the cover 182 may slide into and out of the retracted position. When the outlet box is installed in a structure such as a wall, abutment wall 188 engages the structure and leaves the cover 182 free to move in and out of the retracted position.

Referring to FIGS. 24 and 25, when cover 182 is in the closed position (FIGS. 25 and 29) it preferably lies flush with the upper surface of flange 174. The cover 182 may be supported in the closed position by a first end wall upper surface 214 and a second end wall upper surface 216 shown for example in FIG. 24. Upper surfaces 214 and 216 lie below the flange upper surface a distance approximately equal to the thickness of the cover. Therefore, when the cover 182 is closed it is flush with the flange upper surface (FIG. 25). At the intersection of the first side wall third portion 152 and the flange 174, a notch 218 may be formed to permit the insertion of a tool or use of a finger to assist a user in moving the cover out of the closed position.

When the cover 182 is closed, access to the outlet box interior is restricted. If it is desired to close the cover when wiring is connected to the electrical 144 or communication/data 157 receptacles, one or more knockouts 220 formed on the cover may be removed. Knockouts 220 may be formed in a manner known in the art such as surrounding the knockout with a thin frangible material. The cover may include a plurality of knockouts 220 in order to accommodate a number of wires passing into the box. Since the receptacles 144, 157 are recessed the cover 182 can be closed when the receptacles are in use.

With reference to FIGS. 22 and 23, outlet box assembly 128 may also include arms 222 for securing the outlet box assembly 128 in a wall structure. Arms 222 are rotatable between a first position where they lie next to the perimeter wall such that insertion and removal of the outlet box assembly 128 in the wall opening is permitted, and a second position where they extend outwardly from the perimeter wall to secure the assembly in the wall. The arms are secured to pins 224 having heads 226 engagable with a tool such as a screw driver. Heads 226 are not visible when cover 182 is in its closed position. Rotation of the pins 224 causes the arms 222 to move between the first and second position. The mounting of the outlet box assembly 128 may be performed in a manner described above with respect to the previously described embodiments.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. An outlet box assembly comprising:
   an outlet box including a bottom wall bounded by an outwardly extending perimeter wall forming a housing for receiving a first receptacle;
   an attachment structure disposed in said housing for securing the first receptacle to the outlet box;
   said perimeter wall including a first wall portion extending from said bottom wall and a second wall portion extending at an oblique angle from said first wall portion; and
   said second wall portion including an opening for supporting a second receptacle.

2. The outlet box assembly as defined in claim 1, wherein said first wall portion extends generally perpendicularly from said bottom wall.

3. The outlet box assembly as defined in claim 1, wherein said perimeter wall has an upper portion and a flange extending outwardly from said upper portion.

4. The outlet box assembly as defined in claim 1, wherein said second wall portion includes a plurality of opening for supporting a plurality of second receptacles.

5. The outlet box assembly as defined in claim 1, further including a cover supported on said outlet box and selectively movable between an open position and a closed position.

6. The outlet box assembly as defined in claim 5, wherein said cover is selectively movable between a retracted and un-retracted positions.

7. The outlet box assembly as defined in claim 6, wherein said cover is disposed adjacent said perimeter wall when in said retracted position.

8. The outlet box assembly as defined in claim 6, further including a guide for guiding the movement of the cover relative to the box between the retracted and un-retracted positions.

9. The outlet box assembly as defined in claim 5, further including a hinge for permitting rotation of the cover between said open and closed positions, and wherein said hinge permits rotation when said cover is in an un-retracted position.

10. The outlet box assembly as defined in claim 6, wherein said perimeter wall has an upper portion and a flange extending outwardly therefrom, and said flange includes a slot adapted to receive therein said cover, when said cover is in said retracted position.

11. The outlet box assembly as defined in claim 8, wherein said guide includes a groove on said perimeter side wall and a rail on said cover, and said rail translates within said groove.

12. The outlet box assembly as defined in claim 6, wherein said cover is rotatable between said open and closed positions and translatable between said retracted and un-retracted positions.

13. The outlet box assembly as defined in claim 1, wherein said perimeter wall includes a support surface for supporting a face plate.

14. The outlet box assembly as defined in claim 1, wherein said perimeter wall includes a plurality of walls surrounding all sides of said bottom wall, and each of said plurality of walls extend from said bottom wall in a generally perpendicular direction.

15. The outlet box assembly as defined in claim 1, wherein said first wall portion has an upper end displaced from said bottom wall, and said second wall portion extends from said upper end.

16. The outlet box assembly as defined in claim 6, wherein said perimeter wall has an upper portion and a flange extending outwardly therefrom, and wherein at least a portion of said cover is moved below said flange when said cover is in said retracted position.

17. An outlet box assembly comprising:
an outlet box including a bottom wall bounded by an outwardly extending perimeter wall forming a housing adapted to receive a first receptacle;
a first attachment structure disposed in said housing for securing the first receptacle to said outlet box in a first plane, said first attachment structure being disposed on said perimeter wall above said bottom wall; and
at least one of said plurality of perimeter walls including a second attachment structure for securing a second receptacle in said outlet box in a second plane, and said first plane being angularly offset from said second plane.

18. The outlet box assembly as defined in claim 17, wherein said first attachment structure is vertically offset from said second attachment structure.

19. The outlet box assembly as defined in claim 17, wherein said second attachment structure includes a portion of said perimeter wall.

20. The outlet box assembly as defined in claim 19, wherein the first attachment structure includes first and second spaced posts adapted to receive fasteners for securing the first receptacle to said outlet box.

21. The outlet box assembly as defined in claim 19, wherein said second attachment structure includes at least one opening formed in said perimeter wall for receiving the second receptacle.

22. The outlet box assembly as defined in claim 17, further including a cover for selectively permitting and restricting access to said first and second receptacles.

23. The outlet box assembly as defined in claim 22, wherein said cover is rotatably and translatably secured to said outlet box.

24. The outlet box assembly as defined in claim 22, further including a face plate securable to said first attachment structure and wherein said face plate isolates said housing from said second attachment structure.

25. The outlet box assembly as defined in claim 22, wherein said cover is movable into a retracted position wherein said cover is in opposed spaced relation to said perimeter wall.

26. The outlet box assembly as defined in claim 22, wherein said cover is movable between an un-retracted and retracted position, and said cover is movable downwardly toward the bottom wall when moved toward said retracted position.

27. An outlet box assembly comprising:
an outlet box including a bottom wall bounded by an outwardly extending perimeter wall forming a outlet box interior, said outlet box having an opening for receiving a first electrical receptacle;
a first attachment structure disposed in said outlet box interior for securing the first electrical receptacle to the outlet box; and
a cover rotatable between an open and closed position to selectively cover and uncover said opening, and said cover being translatable to a retracted position wherein said opening is uncovered and said cover is disposed adjacent said perimeter wall.

28. The outlet box assembly as defined in claim 27, wherein said perimeter wall terminates in an outwardly extending flange, and a portion of said perimeter wall and said flange define a slot there-between, and said cover is translatable within said slot.

29. The outlet box assembly as defined in claim 27, further including a guide for guiding the translation of said cover.

30. The outlet box assembly as defined in claim 29, wherein said guide includes a cooperating groove and rail, said groove formed on said perimeter wall and said rail disposed on said cover.

31. The outlet box assembly as defined in claim 27, wherein said outlet box includes an abutment wall spaced from said perimeter wall, said abutment wall and said perimeter wall forming a space in which said cover is disposed when in said retracted position.

32. The outlet box assembly as defined in claim 27, wherein said perimeter wall supports said cover when in said closed position.

33. The outlet box assembly as defined in claim 27, wherein said perimeter wall includes a second attachment structure for securing a second electrical receptacle.

34. An outlet box assembly comprising:
an outlet box including a bottom wall bounded by an outwardly extending perimeter wall forming a housing adapted to receive a first receptacle;

a first attachment structure disposed in said housing for securing the first receptacle to said outlet box in a first plane;

at least one of said plurality of perimeter walls including a second attachment structure for securing a second receptacle in said outlet box in a second plane, and said first plane being angularly offset from said second plane; and a cover for selectively permitting and restricting access to said first and second receptacles, said cover being movable into a retracted position wherein said cover is in opposed spaced relation to said perimeter wall.

35. An outlet box assembly comprising:

an outlet box including a bottom wall bounded by an outwardly extending perimeter wall forming a housing adapted to receive a first receptacle;

a first attachment structure disposed in said housing for securing the first receptacle to said outlet box in a first plane;

at least one of said plurality of perimeter walls including a second attachment structure for securing a second receptacle in said outlet box in a second plane, and said first plane being angularly offset from said second plane; and a cover for selectively permitting and restricting access to said first and second receptacles, said cover being movable between an un-retracted and retracted position, and said cover is movable downwardly toward the bottom wall when moved toward said retracted position.

* * * * *